US 8,867,311 B2

(12) United States Patent
Rikoski

(10) Patent No.: US 8,867,311 B2
(45) Date of Patent: Oct. 21, 2014

(54) SYSTEMS AND METHODS FOR LOW GRATING SIDELOBE SYNTHETIC APERTURE SONAR

(75) Inventor: Richard J. Rikoski, Alameda, CA (US)

(73) Assignee: Hadal, Inc., Oakland, CA (US)

( * ) Notice: Subject to any disclaimer, the term of this patent is extended or adjusted under 35 U.S.C. 154(b) by 309 days.

(21) Appl. No.: 13/466,062

(22) Filed: May 7, 2012

(65) Prior Publication Data

US 2012/0281504 A1 Nov. 8, 2012

Related U.S. Application Data

(60) Provisional application No. 61/483,549, filed on May 6, 2011.

(51) Int. Cl.
| G01S 15/00 | (2006.01) |
| G01V 1/38 | (2006.01) |
| G01C 21/00 | (2006.01) |
| G01S 7/52 | (2006.01) |
| G01S 15/89 | (2006.01) |
| G05D 1/06 | (2006.01) |
| G01C 21/20 | (2006.01) |

(52) U.S. Cl.
CPC .............. *G01V 1/38* (2013.01); *G01C 21/005* (2013.01); *G01S 7/52003* (2013.01); *G01S 15/8904* (2013.01); *G05D 1/0692* (2013.01); *G01C 21/203* (2013.01)
USPC ........................................................ 367/88

(58) Field of Classification Search
USPC ........................................................ 367/88
See application file for complete search history.

(56) References Cited

U.S. PATENT DOCUMENTS

| 4,924,229 | A | | 5/1990 | Eichel et al. |
| 5,155,706 | A | | 10/1992 | Haley et al. |
| 5,736,958 | A | * | 4/1998 | Turpin .......................... 342/179 |
| 5,751,243 | A | * | 5/1998 | Turpin .......................... 342/179 |
| 5,793,703 | A | | 8/1998 | Shippey |
| 5,886,950 | A | | 3/1999 | Billon |
| 7,483,789 | B1 | * | 1/2009 | Walters et al. ................ 701/428 |
| 2002/0093880 | A1 | | 7/2002 | Nakamura |
| 2006/0109741 | A1 | | 5/2006 | Kerfoot et al. |
| 2006/0109742 | A1 | | 5/2006 | Kerfoot et al. |
| 2006/0109743 | A1 | | 5/2006 | Kosalos et al. |
| 2007/0285315 | A1 | * | 12/2007 | Davis et al. ................... 342/377 |
| 2010/0014385 | A1 | * | 1/2010 | Jean et al. ........................ 367/88 |
| 2012/0281503 | A1 | * | 11/2012 | Rikoski ........................... 367/88 |
| 2012/0281505 | A1 | * | 11/2012 | Rikoski ........................... 367/88 |
| 2012/0281506 | A1 | * | 11/2012 | Rikoski ........................... 367/88 |
| 2012/0281507 | A1 | * | 11/2012 | Rikoski ........................... 367/88 |
| 2013/0083621 | A1 | * | 4/2013 | Rikoski ............................. 367/7 |

OTHER PUBLICATIONS

Newman, Paul M., John J. Leonard, and Richard J. Rikoski. "Towards constant-time SLAM on an autonomous underwater vehicle using synthetic aperture sonar." Robotics Research. Springer Berlin Heidelberg, 2005. 409-420.*

(Continued)

*Primary Examiner* — Ian J Lobo
*Assistant Examiner* — James Hulka
(74) *Attorney, Agent, or Firm* — Ropes & Gray LLP

(57) ABSTRACT

The systems and methods described herein relate to systems and methods for synthetic aperture sonar (SAS) having multiple transmitters and generating orthogonal pinging sequences configured to enhance performance.

14 Claims, 14 Drawing Sheets

(56) References Cited

OTHER PUBLICATIONS

Rikoski, Richard J., and John J. Leonard. "Trajectory sonar perception." Robotics and Automation, 2003. Proceedings. ICRA'03. IEEE International Conference on. vol. 1. IEEE, 2003.*

Leonard, John J., et al. "Mapping partially observable features from multiple uncertain vantage points." The International Journal of Robotics Research 21.10-11 (2002): 943-975.*

Rikoski, Richard J., et al. "On Correlating Sonar Images." Robotics: Science and Systems. vol. 1. 2005.*

Saebo, Torstein Olsmo, Roy Edgar Hansen, and Alfred Hanssen. "Relative height estimation by cross-correlating ground-range synthetic aperture sonar images." Oceanic Engineering, IEEE Journal of 32.4 (2007): 971-982.*

Douglas et al., "Synthetic Aperture Active Sonar Imaging," Proceedings of the International Conference on Acoustics, Speech and Signal Processing, 3:37-40 (1992).

Folkesson et al., "A Feature Based Navigation System for an Autonomous Underwater Robot," 6th International Conference on Field and Service Robotics, pp. 1-10 (2007).

Griffiths, H.D., "A Comparison Between Radar and Sonar Synthetic Aperture Interferometry," pp. 4/1-4/5 (1997).

Rikoski et al., "Holographic Navigation," 2008 IEEE International Conference on Robotics and Automation, pp. 73-80 (2008).

Partial International Search Report for PCT/US2012/036828 mailed Aug. 10, 2012.

Hayes et al., "Synthetic aperture sonar: a review of current status." Oceanic Engineering, IEEE Journal of 34.3. pp. 207-224. (2009).

* cited by examiner

First Virtual Array

→ D/4 motion

Second Virtual Array

Combing phase centers from both virtual yields a fused array with D/4 spacing.

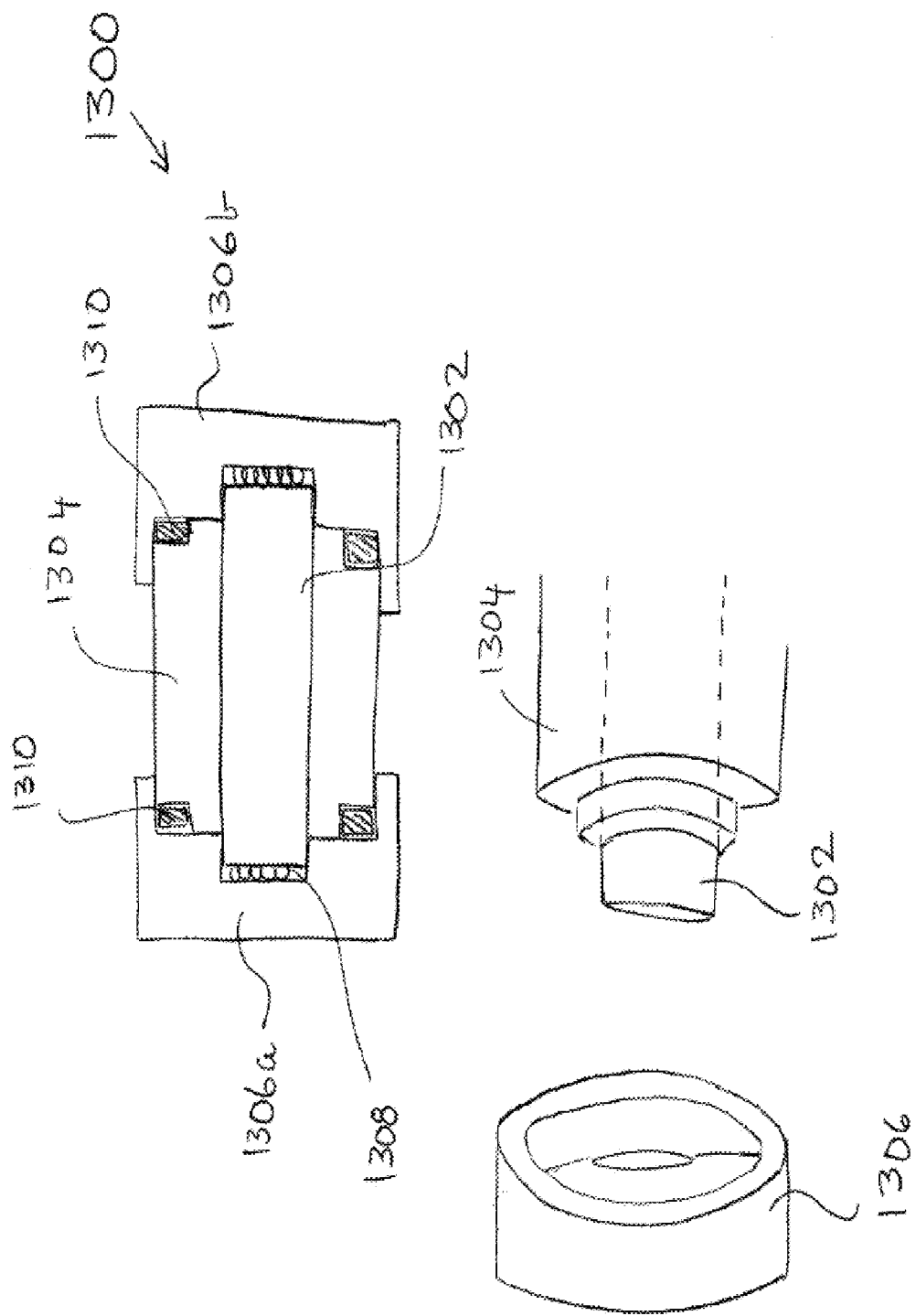

SYSTEMS AND METHODS FOR LOW GRATING SIDELOBE SYNTHETIC APERTURE SONAR

CROSS-REFERENCE TO RELATED APPLICATIONS

This application claims priority to and the benefit of U.S. Provisional Patent Application Ser. No. 61/483,549, filed May 6, 2011 and entitled "Systems and Methods for Synthetic Aperture Sonar," the entire contents of each of which are incorporated herein by reference.

FIELD OF THE INVENTION

The present disclosure relates generally to systems and methods relating to synthetic aperture sonar (SAS) technology. More particularly, in various embodiments, the present disclosure relates to systems and methods for synthetic aperture sonar or radar systems by adding multiple transmitters and generating orthogonal pinging sequences configured to enhance performance.

BACKGROUND

In most land-based applications, navigation is often aided by in-place infrastructure such as GPS, radio beacons or a priori maps. Navigation and mapping underwater is difficult because among other things, wide-coverage underwater GP-equivalents do not exist and large portions of the sea bed are still unexplored.

Current techniques for underwater navigation use publicly available bathymetry maps. However, these maps are relatively coarse and unsuitable for precision navigation. Other sonar-based navigation systems rely on positioning schemes that use the sonar data itself. For example, on-the-fly acoustic feature-based systems attempt to use sonar to detect naturally occurring landmarks. Other solutions to the navigation problem include deploying low-cost transponders in unknown locations thereby enabling range-based measurements between the vehicle and transponder beacon. However, these transponders are often deployed at locations that are at great distances from each other, and often only partially observable because of the range-only information. Thus, these technologies are unsuitable for navigation across small vehicle paths.

Recent technologies permit navigation of underwater terrain relative to a prior map of the terrain. Such technologies use synthetic aperture sonar systems for generating images of the terrain, which are then compared against a prior image associated with the terrain. Underwater vehicles may then be able to navigate on the terrain relative to their location on the map. These technologies, however, suffer from a plurality of deficiencies including the amount of power consumed, size and shape of the systems. Additionally, the performance of such navigation systems dramatically decreases as transmitter frequencies increase and wavelengths decrease.

Accordingly, there is a need for improved map-based navigation systems, particularly for underwater applications.

SUMMARY

The devices, systems and methods of the inventions described herein address these and other deficiencies of existing navigation systems. By generating the sonar signals and designing the synthetic aperture sonar array using the systems and methods described below, significant improvements may be achieved, at least in image generation and navigation capability.

As noted above, it may be desirable to be able to navigate terrain (whether on land or underwater) in a vehicle equipped appropriately with sensors that allow the vehicle to navigate the terrain relative to a prior map of the terrain. There exists several sonar-based imaging and mapping technologies, including, among others, sidescan sonar and synthetic aperture sonar (SAS). In these technologies, the quality of the map or image is related to its angular resolution. The angular resolution, which is the minimum angle for which two targets can be separated in a sonar image, is proportional to the array length measured in wavelengths. Longer arrays or higher frequencies (smaller wavelengths) gives better angular frequencies. Sidescan sonar uses a fixed-length moving array of receivers to cover different parts of the seafloor. Typical sidescan sonars produce one or a few beams, and an image is produced by moving the sonar and using repeated pulses. Because longer arrays typically require more electronics, hardware and space on the vehicle, sidescan sonar systems include small arrays that operate at high frequencies (typically, although not always, greater than 100 kHz). However, frequency dependent absorption of sound in the oceans places limits on the range of high frequency sidescan sonars.

Synthetic aperture sonar (SAS) imaging systems were successful in overcoming some of the deficiencies of side-scan sonar systems. SAS technology uses the forward motion of a small physical array to synthesize a much longer array, thus resulting in a much finer along-track resolution and higher signal to noise ratios (SNR) than that of an actual physical array. Thus, SAS allows for much higher resolutions at lower frequencies than sidescan sonar systems. In fact, to provide for higher ranges than sidescan sonar, most current day SAS technologies operate at low frequencies (less than 100 kHz). In addition to the increased range, low frequencies allow for higher relative bandwidths Both sidescan and SAS technologies have been used for map-based navigation systems. Sidescan sonar images have been incoherently processed using template matching and spatial constraints to provide navigational information and recognize mine-like objects. Recently, the holographic nature of a low-frequency SAS image, namely, the observation that low-frequency SAS images capture the same target from different vantage points, has been leveraged for coherent terrain recognition and navigation. Thus, low frequency SAS is generally better suited for map-based navigation than high-frequency sidescan sonar.

Nevertheless, there are several disadvantages of low frequency SAS. Lower frequencies demand longer apertures, which in the case of moving SAS platforms could introduce errors and angular variations. Furthermore, low-frequency systems require larger electronics and more power, luxuries that may not be available on smaller autonomous underwater vehicles (AUVs) or unmanned aerial vehicles (UAVs). Likewise, low frequency projectors are often heavier than their high frequency equivalents, preventing their use on small lightweight systems.

Current map-based navigation technologies discourage the use of high-frequency SAS (greater than about 100 kHz) for navigation because of increased attenuation and poor performance, which in turn was thought to be attributable to the effects of shadowing, occlusion and complex 3D relief changes in relief. These effects were thought to change the signature of the sound signal, and accordingly break down the assumption that a change in vertical aspect maps to a change in pitch.

However, the Applicants have recently recognized that that this assumption is not entirely correct and traditional holographic navigation techniques may fail at higher frequencies due to spatially varying phase errors (e.g., range varying phase errors.) Applicants have also recognized that traditional holographic navigation techniques may fail at lower frequencies due to these types of errors that occur in difficult ocean conditions such as rough seas or spatially varying sound speeds. The systems and methods described herein overcome the limitations described above and provide for high-frequency (about 100 kHz and greater) sonar imaging and coherent terrain recognition and navigation. The systems and methods described herein also provide for low frequency (less than about 100 kHz) sonar imaging and coherent terrain recognition and navigation.

In particular, the systems and methods described herein include techniques for coherently correlating a real aperture sonar image or a SAS image, with a prior SAS map having at least partially overlapping frequencies. The systems and methods also include techniques for coherently correlating a SAS image with a prior real aperture map having at least partially overlapping frequencies. Generally, these techniques compensate for difference in vertical aspect between the image and the prior map, and thereby allow for coherent correlation. Moreover, these techniques correct for range varying phase errors and can therefore allow operation at much higher frequencies. These systems and methods may be used for terrain recognition, navigation, and position estimation. Furthermore, given the ability of the systems and methods described herein to locate a position on a map with high-precision, beacons and sensors may be placed carefully to avoid obstacles such as rocks or scientific instruments may be placed precisely on the sea floor.

The systems and methods described herein also include, in various aspects, the use of orthogonal signals for SAS, overpinging with multiple transmitters, and holographic simultaneous localization and mapping (SLAM).

In certain aspects, the systems and methods described herein include methods for generating a synthetic aperture sonar image. The methods may include providing a synthetic aperture sonar (SAS) array having at least one transmitter element and a plurality of receiver elements arranged along a first axis. Each of the transmitter element and the receiver elements may have a first width, and the transmitter element may be configured to generate a first set of signals having a plurality of orthogonal acoustic signals. The methods may include calculating the effective spacing of the SAS array, representing an effective distance between the transmitter element and the receiver elements during motion, simultaneously moving the SAS array along the first axis and generating, using the transmitter element, a first acoustic signal from the first set of signals, and calculating a threshold distance as the effective spacing divided by the number of acoustic signals in the first set of signals. In certain embodiments, in response to determining that the SAS array has moved the threshold distance, the methods may include generating, using the transmitter element, a second acoustic signal from the first set of signals, wherein the second acoustic signal is orthogonal to the first acoustic signal. The effective spacing may be about half the first width.

In certain embodiments, one or more acoustic signals in the first set of signals has a frequency greater than 100 kHz. One or more acoustic signals in the first set of signals may have a frequency in range from about 100 Hz to about 100 kHz.

The SAS array may be moved at fixed speed and the determination whether the SAS array has moved the threshold distance is based on a time delay. In certain embodiments, during a first time period the SAS array transmits only the first acoustic signal, during a second time period the SAS array transmits both the first acoustic signal and the second acoustic signal, and during a third time period the SAS array transmits only the second acoustic signal.

In certain embodiments, a duration of the first acoustic signal is substantially similar to a duration of the second acoustic signal. One or more signals in the first set of signals may include a short pulse sound generated for undersea measurement.

The SAS array may be disposed on at least one of an underwater vehicle or a surface vehicle for imaging an underwater terrain. The SAS array may be disposed on at least one of an aerial vehicle or a terrestrial vehicle for imaging a terrestrial terrain.

In another aspect, the systems and methods described herein include methods for generating a synthetic aperture sonar (SAS) image. The methods may include providing a synthetic aperture sonar (SAS) array having at least one transmitter element and a plurality of receiver elements arranged along a first axis, wherein each of the transmitter element and the receiver elements have a first width. The methods may further include simultaneously moving the sonar array along the first axis and generating, using the transmitter element, a first set of acoustic signals at intervals having a first duration and a second set of acoustic signals at intervals having a second duration. In certain embodiments, the sonar array includes a first effective spacing representing an effective distance between the transmitter element and the receiver elements during motion. The first set of acoustic signals may be orthogonal to the second set of acoustic signals, and the first duration and the second duration may be selected such that the first effective spacing is less than one-half the first width.

In certain embodiments, the first duration and the second duration are selected such that the first effective spacing is about one-quarter the first width. The methods may further comprise generating a first number of acoustic signals, wherein the first duration and the second duration are selected such that the first effective spacing is about one half the first width divided by the first number of acoustic signals.

In yet another aspect, the systems and methods described herein include systems for generating a synthetic aperture sonar (SAS) image. The systems may include a synthetic aperture sonar (SAS) array having at least one transmitter element and a plurality of receiver elements arranged along a first axis, wherein each of the transmitter element and the receiver elements have a first width, wherein the transmitter element is configured to generate a first set of signals having a plurality of orthogonal acoustic signals. The systems may also include a processor configured for calculating the effective spacing of the SAS array, representing an effective distance between the transmitter element and the receiver elements during motion, simultaneously moving the SAS array along the first axis and generating, using the transmitter element, a first acoustic signal from the first set of signals, and calculating a threshold distance as the effective spacing divided by the number of acoustic signals in the first set of signals. In certain embodiments, in response to determining that the SAS array has moved the threshold distance, the processor may be configured for generating, using the transmitter element, a second acoustic signal from the first set of signals, wherein the second acoustic signal is orthogonal to the first acoustic signal.

They systems and methods described herein may be adapted as desired for both sonar and radar systems. For example, sonar transducers may be replaced with suitable radar transducers, and one or more components may be modified, added to or removed from the systems described herein to operate in a sonar and radar regime. In some embodiments, the systems and methods may be configured to operate as both sonar and radar devices, without departing from the scope of the present disclosure. In certain embodiments, when the systems and methods are configured for sonar imaging, the frequencies may be in both high and low frequency ranges in the range from 10 kHz to about 200 kHz. In certain embodiments, when the systems and methods are configured for radar imaging, the frequencies may be in the range from 100 MHz to about 30 GHz. Generally, the systems and methods described herein may be applied for any frequency range, without departing from the scope of the present disclosure.

BRIEF DESCRIPTION OF THE DRAWINGS

The foregoing and other objects, features, advantages, and illustrative embodiments of the invention will now be described with reference to drawings in which like reference designations refer to the same parts throughout the different views. These drawings are not necessarily to scale, emphasis instead being placed upon illustrating principles of the embodiments.

FIG. 13 depicts a device for pressure and substance compensation, according to an illustrative embodiment of the present disclosure.

DETAILED DESCRIPTION

Figure 1:
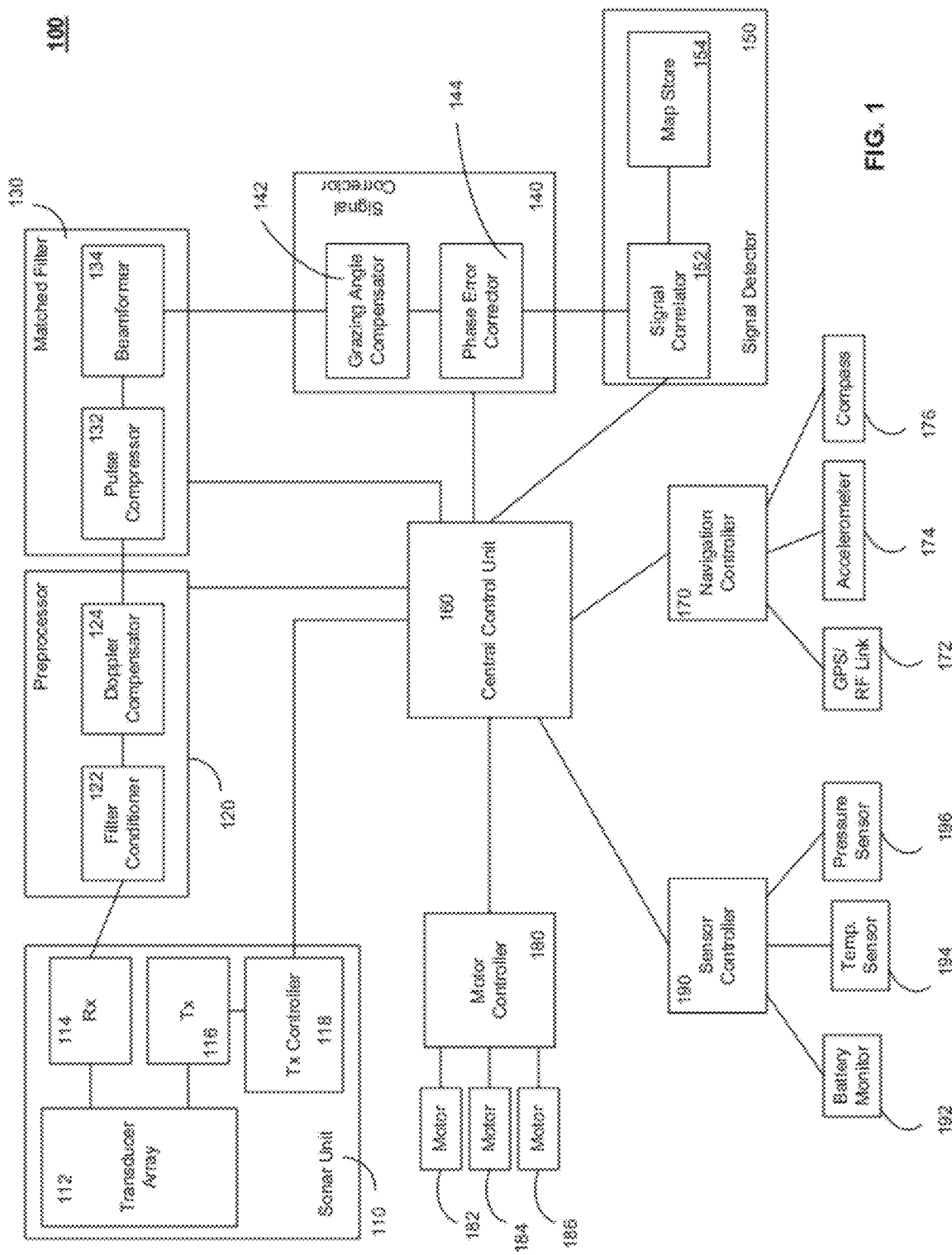
FIG. 1 is a block diagram depicting a sonar mapping and navigation system, according to an illustrative embodiment of the present disclosure.

To provide an overall understanding of the systems and methods described herein, certain illustrative embodiments will now be described, including systems and methods for mapping and navigating a terrain. However, it will be understood by one of ordinary skill in the art that the systems and methods described herein may be adapted and modified for other suitable applications and that such other additions and modifications will not depart from the scope thereof.

The systems and methods described herein include high-frequency ("HF") holographic navigation, namely map-based navigation using the multi-aspect holographic-nature of synthetic aperture sonar (SAS) images captured at frequencies greater than or equal to about 100 kHz. The systems and methods described herein also include low frequency ("LF") holographic navigation at frequencies less than about 100 kHz. In particular, the systems and methods described herein allow for coherent correlation between images, currently captured, and prior maps when there is an overlap in frequency and aspect. Such coherent correlation allows for position and/or heading-based navigation. At high-frequency, the inventor has recognized that images suffer from spatially varying phase errors (e.g., range varying phase errors), which cause image and/or correlation distortion. Such phase errors may exist even at low frequencies when there are altitude variations. In certain embodiments, when the phase errors are much smaller than the bandwidth, although images may not be distorted, correlation (and therefore navigation) may become difficult. The systems and methods described herein overcome the deficiencies of the prior art by introducing a phase error corrector configured to cut the image into smaller regions where phase is relatively constant and use these phase measurements to correct portions of the image.

The systems and methods described here make use of various other aspects of the holographic nature of synthetic aperture images, which the inventor has recognized. For example, systems and methods are described herein for determining a three-dimensional model of a shape based on its two dimensional shading and shadowing of acoustic signals. The systems and methods described herein include methods for positioning sensors (such as Tsunami sensors) and navigation beacons with high-precision using HF holographic navigation. The systems and methods described herein include methods for monitoring and modeling a water column using an autonomous underwater vehicle (AUV) based on high-precision location measurements obtained using HF holographic navigation. In certain embodiments, the systems and methods include a seismic survey system having a combination of orthogonal transmitters and multiple receivers to form a full planar synthetic aperture sonar with higher resolution.

In other aspects, the systems and methods described herein include adding multiple transmitters to the array and generating orthogonal pinging sequences. In particular, the systems and methods described herein include a SAS having a low-grating sidelobe, a SAS having a high coverage rate using multiple transmitters, and an overpinging sequence for increasing the range of the SAS system. The systems and methods described herein further include bistatic and monostatic holographic gapfilling techniques for localizing an emitter or receiver with high precision relative to a terrain. In still other aspects, the systems and methods described herein include simultaneous localization and mapping (SLAM)

techniques that involve beamforming a real aperture image such that it can be coherently correlated with a prior real aperture image of overlapping frequencies. Each of these and other systems and methods described herein may be used independently of each other or in any suitable combination of one or more any other system and method. Modifications and variations described with reference to a system and method described herein may be applied to any other system and method described herein, without departing from the scope of the present disclosure.

Figure 6A:
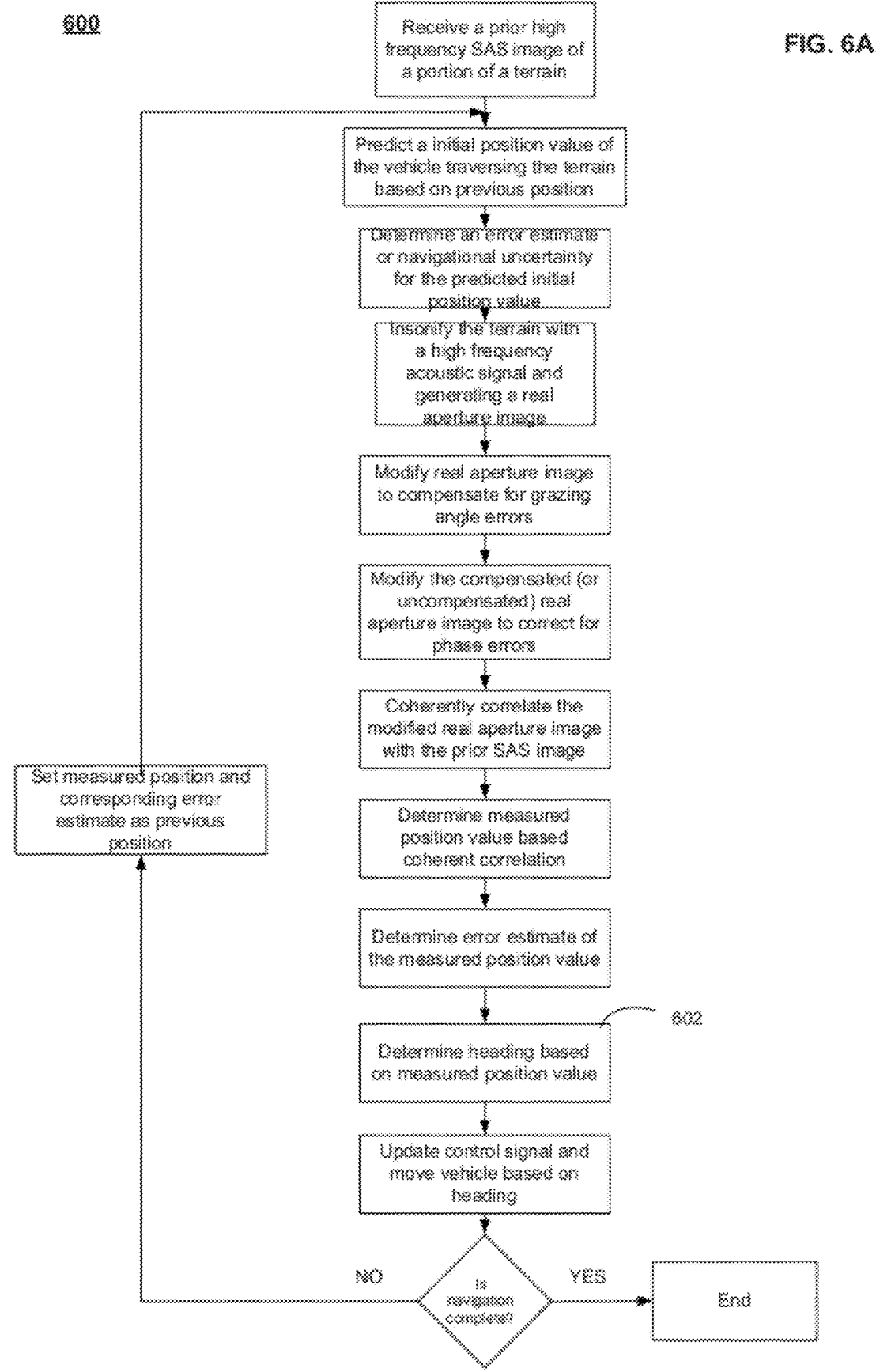
FIGS. 6A-6B depicts a process for navigating a terrain using an exemplary high-frequency sonar navigation system, according to another illustrative embodiment of the present disclosure.
Figure 6B:
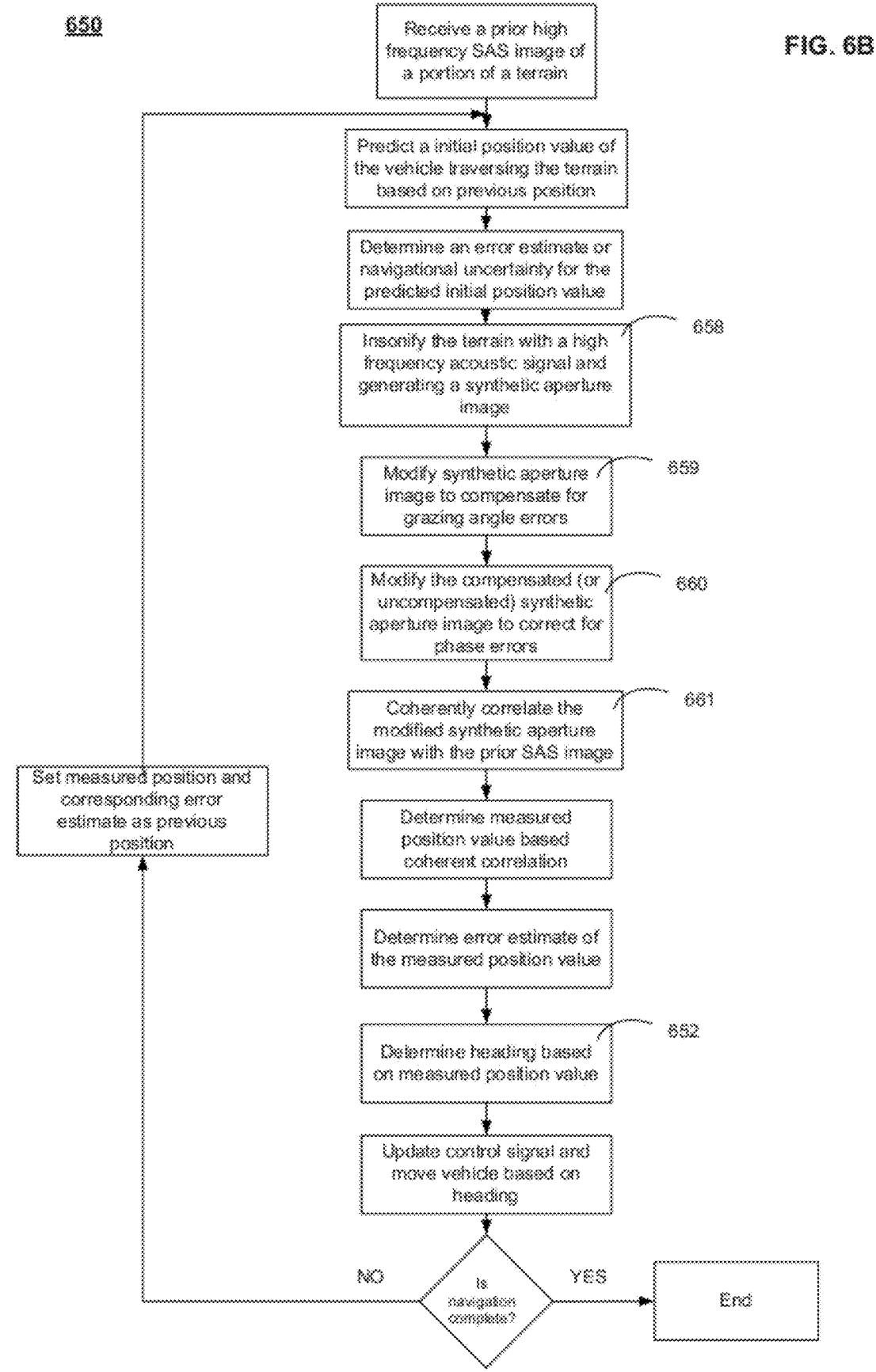
Figure 7:
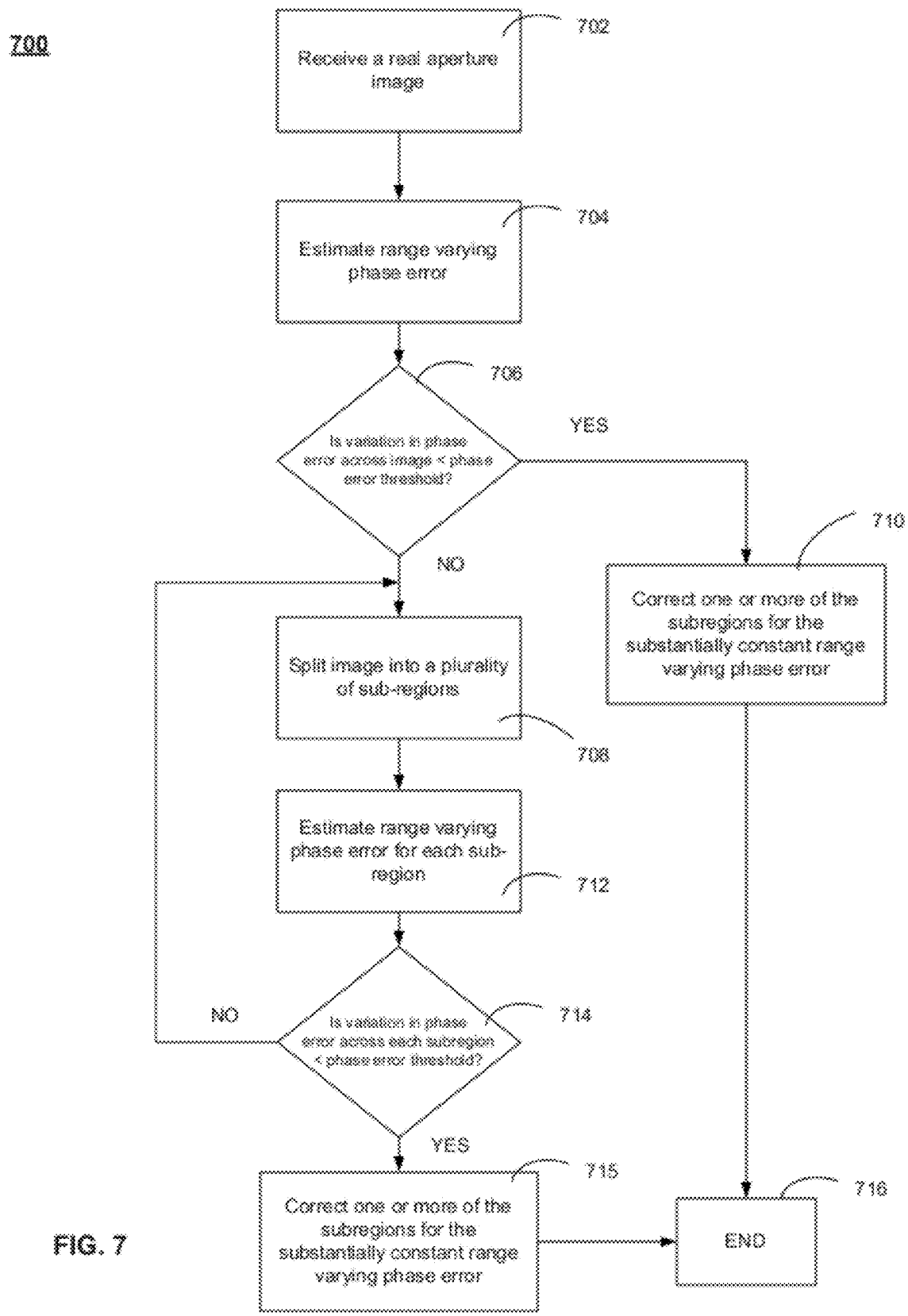
FIG. 7 depicts a process for correcting range varying phase errors in a high-frequency sonar system, according to an illustrative embodiment of the present disclosure.
Figure 8:
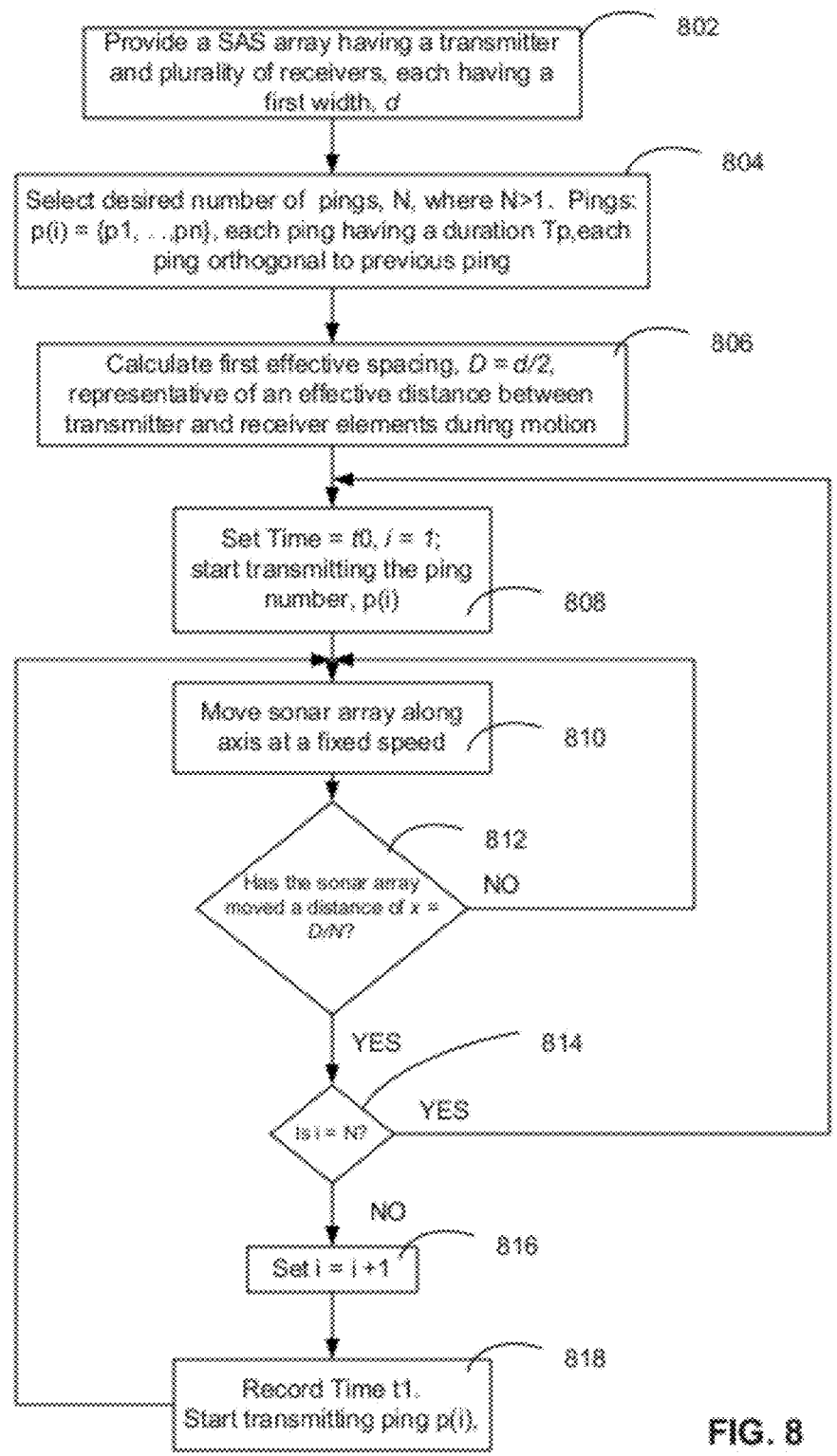
FIG. 8 depicts a process for using a plurality of orthogonal signals in a synthetic aperture sonar (SAS) system to generate images, according to an illustrative embodiment of the present disclosure.
Figure 9A:
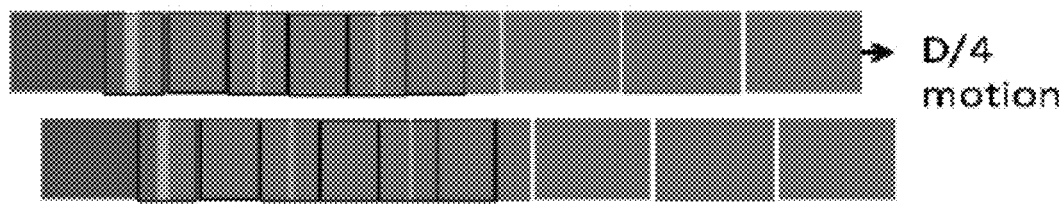
FIGS. 9A and 9B depict a transducer array used in connection with an embodiment of the process depicted in FIG. 8, according to an illustrative embodiment of the present disclosure.
Figure 9B:
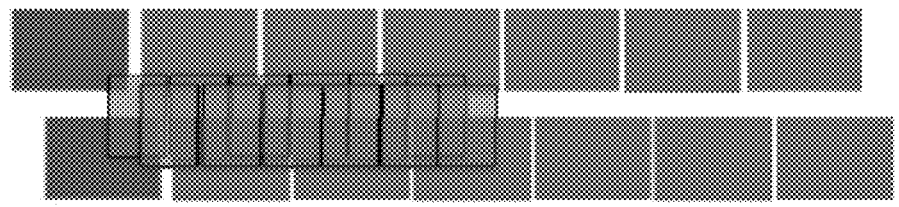
Figure 10:
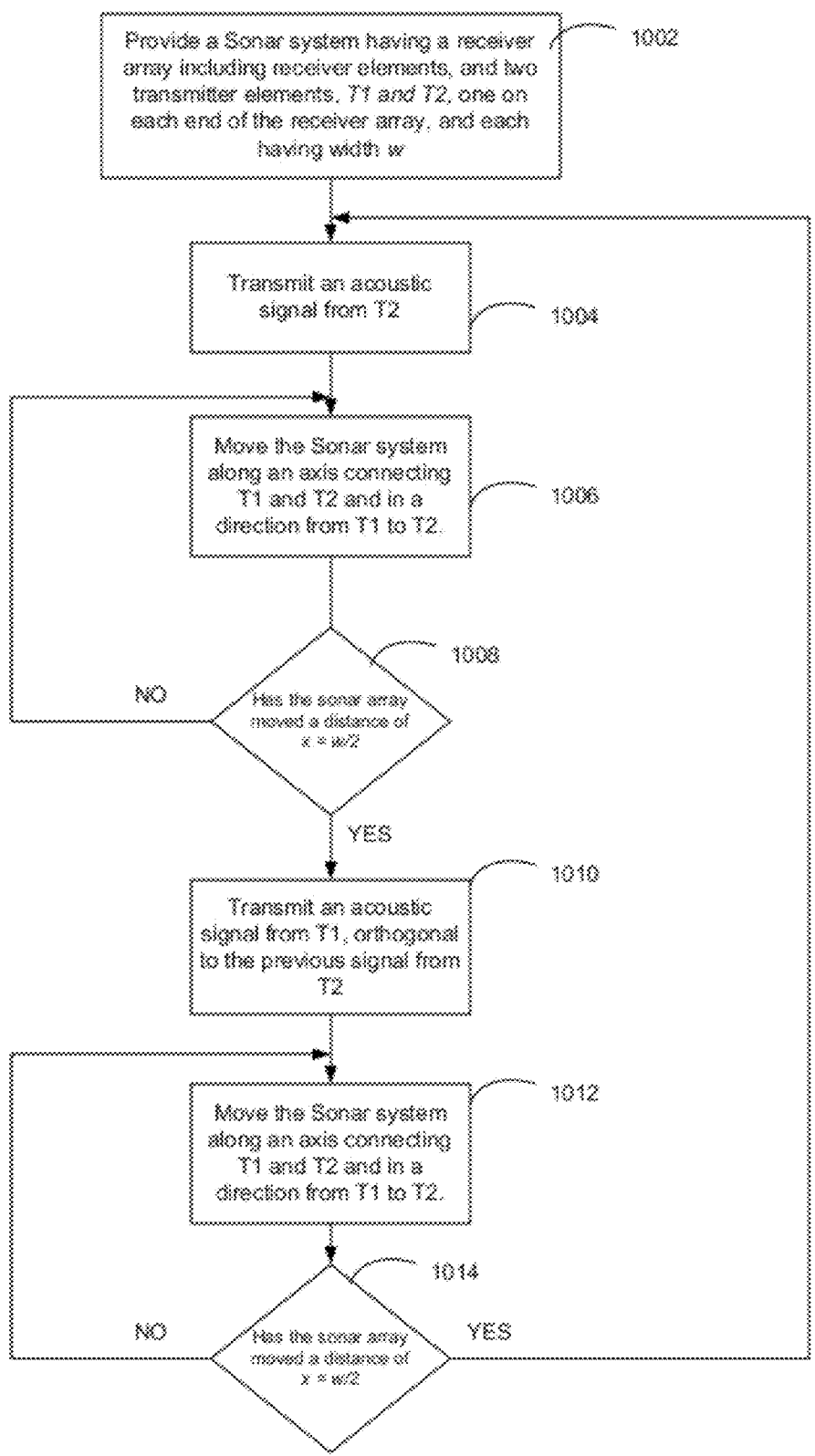
FIG. 10 depicts a process for transmitting pulses from a synthetic aperture sonar (SAS) system having multiple transmitters, according to an illustrative embodiment of the present disclosure.
Figure 11A:
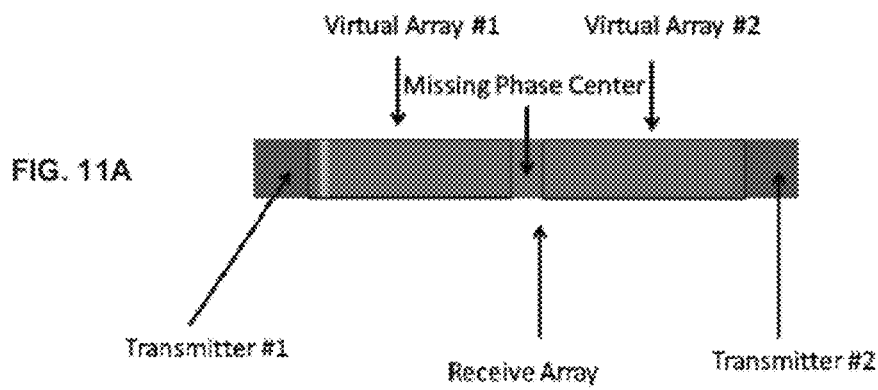
FIG. 11A-C depict a transducer array used in connection with an embodiment of the process depicted in FIG. 10, according to an illustrative embodiment of the present disclosure.
Figure 11B:
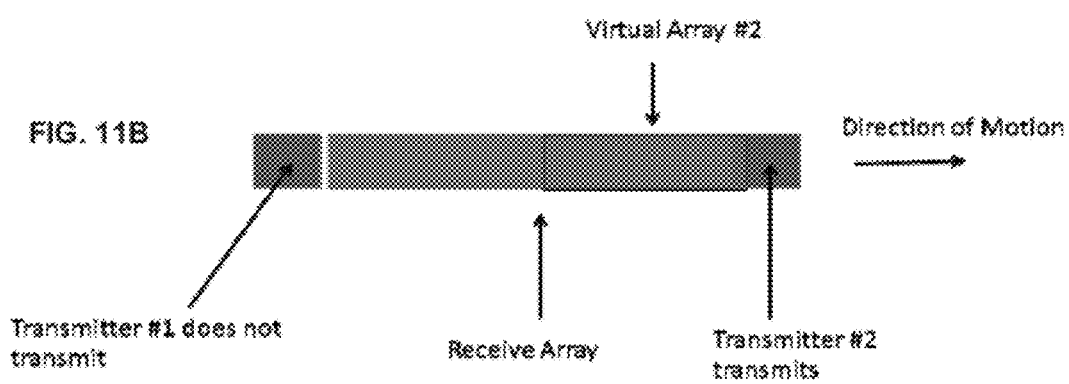

In the following passages, an illustrative mapping and navigation system and an illustrative computer system for executing holographic navigation and mapping is described with reference to FIG. 1-4, respectively. Further illustrative embodiments of components and processes of the holographic navigation and mapping system include processes for navigating a terrain, for example an underwater terrain, using a map are described with reference to FIGS. 5 and 6. To allow for high-frequency holographic navigation, FIG. 7 describes a process for correcting range varying phase errors, recognized by the inventor to be a reason for the failure of traditional holographic navigation, coherent correlation, and change detection systems at higher frequencies. FIGS. 8-9B depict a process and components for generating SAS images having low grating sidelobes, and FIG. 10-11B depict a process and components for generating a high-coverage rate SAS signals. Finally, FIG. 12 describes a holographic SLAM process for navigating a terrain.

More particularly, FIG. 1 is a block diagram depicting a sonar mapping and navigation system 100, according to an illustrative embodiment of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In certain embodiments, the system may be mounted on vehicle navigating over a terrain, such as an autonomous underwater vehicle (AUV) or an unmanned aerial vehicle (UAV). In such embodiments, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain embodiments, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain embodiments, the peak of the envelope may be identified with high-precision, including down to the order of about $\frac{1}{100}^{th}$ of the wavelength. For example, the resolution may be less than 2.5 cm, or less than 1 cm or less than and about 0.1 mm in the range direction.

Generally, terrain recognition using long wavelength (low-frequency) sensors may be difficult due to the aspect dependence of object signatures. Sonar or radar images may be dominated by speckle that change with both sonar and object aspect, making incoherent image correlation extremely difficult. Coherently, any correlation operation involving signals with non-overlapping frequency bands will yield an answer of zero (since correlation is multiplication in the frequency domain). For two sonar images to correlate it is not enough that their spatial frequencies overlap, but the same points in the two images must be represented at overlapping frequencies. For a generic real aperture sonar, the same signature for a complex scene can only typically be re-observed by revisiting the original observation position and orientation and using the same frequencies. Consequently, in general, getting two complex sonar or radar images to coherently correlate is a measure zero occurrence; the expected cross correlation can be proven to be approaching zero. Therefore, coherently navigating relative to terrain is, in general, impossible if the system compares real aperture imagery to prior real aperture imagery, except as described below with reference to FIG. 12. Incoherent navigation is possible (i.e. using only the envelope) if there is distinct terrain, but against a uniform bottom (mud flat, field of gravel, ocean floor, etc.) this is usually not so.

Holographic navigation of a terrain, e.g., using a system implemented on AUVs, solves this problem by replacing at least one of the real aperture images with a synthetic aperture image. Because a synthetic aperture image is a type of hologram (or quasi-hologram) it contains all possible real aperture images over some range of frequencies and angles. Consequently, it may be possible to correlate a real aperture image against the synthetic aperture image and have a non-zero expected cross correlation. However, according to the Closed/Open Aperture theorem, it may be required that the synthetic aperture be a planar synthetic aperture, meaning that it is fully populated and Nyquist sampled in two dimensions. This type of population and sampling frequency is, in general, impractical.

By assuming the terrain is a manifold with embedded scatterers on the surface, and avoiding sub-bottom profiles/operating above the critical angle, or operating below the critical angle where the SNR is low, it is possible to show that the planar aperture can be replaced with a contour aperture provided the frequencies can rescaled. For example, consider an active sonar or radar and two scatterers spaced 5 centimeters apart in range on a flat bottom. From the perspective of a sonar or radar looking at the scatterers from the ground, the distance of travel for the two echoes differ by 10 cm (out and back). If the observer is, instead, looking down at an angle of 45 degrees above horizontal, the difference is shorted by cosine of 45 degrees (half) to 7.07 cm. So at horizontal a 10 cm wavelength would be exactly one cycle out of phase (constructively interferes), and a 20 centimeter wavelength would be exactly a half cycle out of phase (destructively interfere). At 45 degrees, the same would be true of a 7.07 cm wavelength and a 14.14 cm wavelength. Both wavelengths are scaled by the same amount (and, similarly, so are frequencies, except inversely). More generally, a change in vertical angle shifts all frequencies and changes the signal length by the cosine of the angle. This is not a shift in frequency so much as a change in pitch, where a doubling in frequency corresponds to a change in pitch of one octave. So by changing the observation angle from horizontal to looking down at 60 degrees the expected return is shorted by half and increases in pitch by one octave. In order for this to work, it is necessary for the second observation to be made with appropriately scaled frequencies relative to the first; for a very narrowband system too much of a change in grazing angle simply leads to the known signatures being out of band.

In some embodiments, using grazing angle compensation and a prior synthetic aperture image of the systems and methods described herein, it is possible to navigate relative to terrain using a single element sonar or radar. Although synthetic aperture systems are extremely expensive, single element systems are generally very cheap. This means a very expensive mapping system can enable the widespread use of cheap autonomous systems with minimal inertial navigation. However, successful holographic navigation implementations to date have all used low frequency sonars (i.e. under 50 kHz), while the higher frequency systems have not worked. This is unfortunate, because lower frequency transmitters are, in general, larger, higher power, and more expensive. Thus, it is desirable to have a high frequency single element holographic navigation system. Further illustrative embodiments of holographic navigation systems and methods are disclosed in U.S. patent application Ser. Nos. 12/802,453, 12/454,486, 12/454,484, and 12/454,885, the contents of each of which are incorporated herein by reference in their entirety.

In one aspect, the invention relates to a method of terrain relative localization via holographic navigation. Holographic navigation and holographic maps are further described in U.S. patent application Ser. Nos. 12/798,169 and 12/802,455, the contents of each of which are incorporated herein by reference in their entirety. In some respects, holographic navigation is a method of terrain relative localization that takes advantage of the holographic properties of sonar and radar images. Quite often such terrain relative localization is performed by a system implemented on an autonomous underwater vehicle (AUV). However, the performance of holographic navigation algorithms implemented on such systems may degrade substantially as frequencies increase and wavelengths decrease. Conventionally, it is generally assumed that such degradation is because the some of the assumptions of grazing angle compensation break down. In other words, it is assumed that a change in vertical aspect no longer maps to a pure change in pitch because shadowing, occlusion, and complex three dimension relief fundamentally change the signature. However, the inventor has recently recognized that this assumption is not entirely incorrect, and that holographic navigation may fail at higher frequencies due to spatially varying phase errors. In some embodiments, the invention corrects for those range varying phase errors by allowing for holographic navigation at higher frequencies with lower power consumption and smaller sized hardware.

Figure 3:
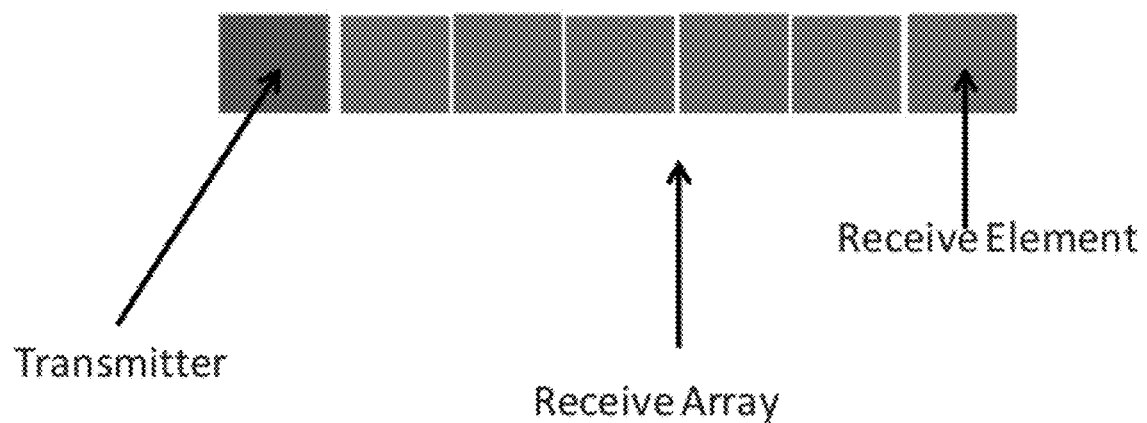
FIG. 3 depicts a transducer array in a sonar system, according to an illustrative embodiment of the present disclosure.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain embodiments the transducer array 112 includes separate projectors and receivers. The transducer array 112 may be configured to operate in SAS mode (either stripmap or spotlight mode) or in a real aperture mode. In certain embodiments, the transducer array 112 is configured to operate as a multibeam echo sounder, sidescan sonar or sectorscan sonar. One example of a transducer array is shown in FIG. 3 having one transmitting elements and six receiving elements. The transmitting elements and receiving elements may be sized and shaped as desired and may be arranged in any configuration, and with any spacing as desired without departing from the scope of the present disclosure. As described later in the present disclosure the number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping.

The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130.

The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. The phase error corrector 144 may correct for phase error using a technique described with reference to FIG. 7. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one embodiment, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain embodiments the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
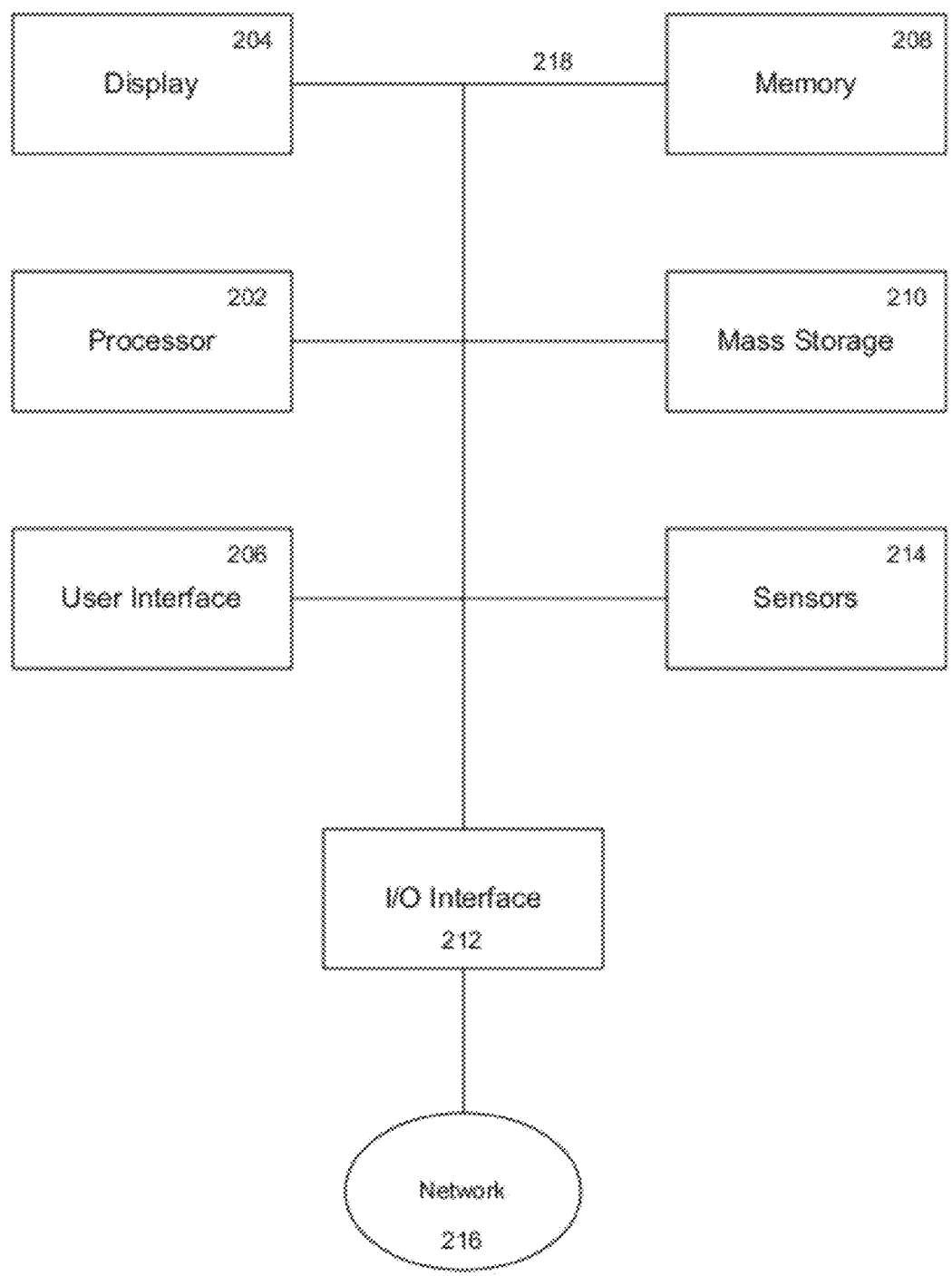
FIG. 2 is block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a general purpose computer accessing a network according to an illustrative embodiment of the present disclosure. The holographic navigation systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multiprocessor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some embodiments, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some embodiments, communications may occur over an acoustic modem. For instance, for AUVs, communications may occur over such a modem. Alternatively, the system 200 may include a mainframe or other type of host computer system capable of web-based communications via the network 216.

In some embodiments, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some embodiments, a system implementing high frequency holographic navigation requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

Figure 4:
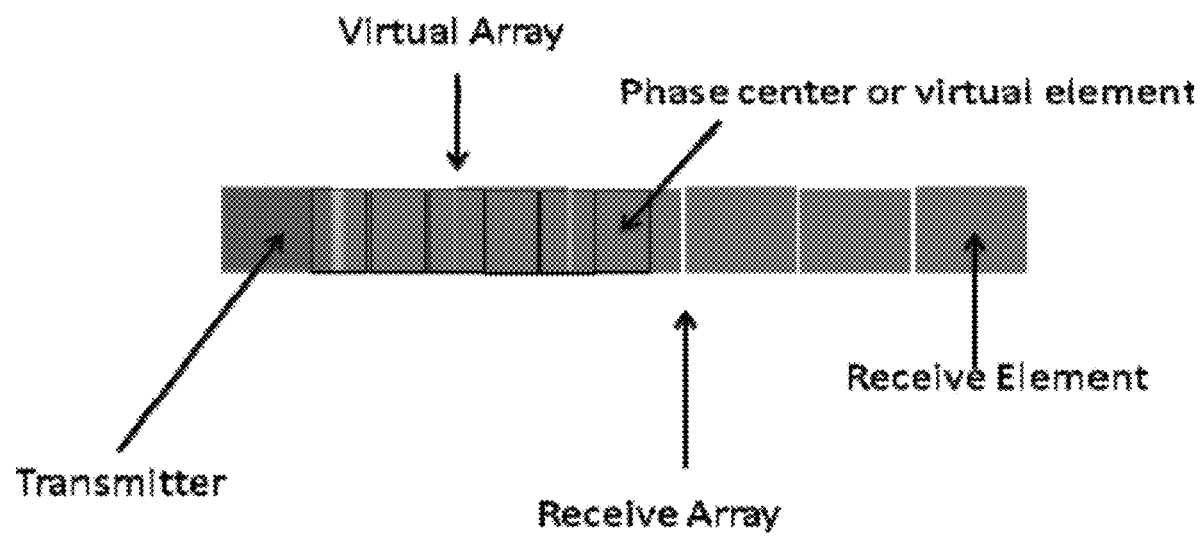
FIG. 4 depicts a transducer array in a synthetic aperture sonar (SAS) system, according to an illustrative embodiment of the present disclosure.

In some embodiments, a system implementing high frequency holographic navigation requires a processor coupled to one or more coherent sensors (e.g., a sonar, radar, optical antenna, etc.) 214. Examples of suitable sensor arrays are illustrated schematically in FIGS. 3 and 4. An exemplary sonar array is shown in FIG. 3. This array includes a transmitter, receive array, and receive element. An exemplary synthetic aperture sonar array is shown in FIG. 4. This array includes a transmitter, receive array, and receive element, and a virtual array with an associated phase center/virtual element.

Data corresponding to a model of the terrain, data corresponding to a holographic map associated with the model, and a process for grazing angle compensation may be performed by a processor 202 operating on the data, as shown in FIG. 2. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some embodiments, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

High-Frequency Holographic Navigation

In one aspect, the systems and methods described above include methods for determining a navigational position of an underwater vehicle traversing an underwater terrain. The methods may include receiving a map including a high frequency synthetic aperture image of a portion of an underwater terrain being traversed by an underwater vehicle, the map including acoustic data, within a first high frequency range, obtained from synthetic aperture sonar (SAS) imaging of the portion of the underwater terrain. The methods may further include predicting a first position value, wherein the first position value represents the location of the underwater vehicle on the map of the underwater terrain, and generating a real aperture image of the portion of the underwater terrain by insonifying the portion of the underwater terrain with an acoustic signal within a second high frequency range. The second high frequency range may at least partially overlap with the first high frequency range. The methods may include modifying the real aperture image by compensating for grazing angle errors to generate a grazing angle invariant real aperture image, and correcting for phase errors in the grazing angle invariant real aperture image. The methods may further include coherently correlating the modified real aperture image with the map and updating the first position value based on the coherent correlation. In certain embodiments, the map is modified by compensating for grazing angle errors to generate a grazing angle invariant map.

In certain embodiments, the first and second high frequency ranges include a minimum frequency greater than 100 kHz. The second high frequency range may be a subset of the first high frequency range. The overlap between the first high frequency range and the second high frequency range may be implicit, such that a frequency range of the grazing angle compensated real image may at least partially overlap with a frequency range of the map when modified to compensate for grazing angle errors.

In certain embodiments, generating a real aperture image includes a plurality of real aperture images, each of the plurality of real aperture images representing a subset of the portion of the underwater terrain. In such embodiments, the phase error in each of the plurality of real aperture images is substantially constant. The step of correcting for phase errors may include splitting the image into a plurality of sub-regions, each sub-region having a substantially constant range varying phase error, estimating the range varying phase error for each sub-region, and modifying the image by correcting each sub-region of the image for the corresponding phase error.

In certain embodiments, modifying the real aperture image includes estimating a range varying phase error and applying a first correction based on the estimated range varying phase error. In such embodiments, estimating the range varying phase error includes at least one of unwrapping phase values, applying least squares fit and applying a fast fourier transform.

The method may further comprise repeating the steps of predicting the first position, generating the real aperture image, modifying the real aperture image, coherently correlating the real aperture image and updating the first position, wherein the first position includes the updated first position from the previous repetition.

The method may further include determining a heading of the underwater vehicle based on the updated first position. Generally, the first position value may be calculated using at least one of global positioning system (GPS) estimation, inertial guidance systems, compass and accelerometer. The underwater vehicle may include an autonomous underwater vehicle (AUV) and the underwater terrain may include at least a portion of the sea bed.

In another aspect, the systems and methods described herein may include systems for navigating in an underwater terrain. The systems may include a map store, for receiving a map including a high frequency synthetic aperture image of a portion of an underwater terrain being traversed by an underwater vehicle, the map including acoustic data, within a first high frequency range, obtained from synthetic aperture sonar (SAS) imaging of the portion of the underwater terrain. The systems may also include a transducer array, for generating a real aperture image of the portion of the underwater terrain by insonifying the portion of the underwater terrain with an acoustic signal within a second high frequency range, wherein the second high frequency range at least partially overlaps with the first high frequency range. In certain embodiments, the systems may include a grazing angle compensator for modifying the real aperture image by compensating for grazing angle errors and generating a grazing angle invariant image, a phase error corrector for modifying the grazing angle invariant image to correct for phase errors, and a signal correlator for coherently correlating the modified real aperture image with the map. The system may also include a central control unit for predicting a first position value, wherein the first position value represents the location of the underwater vehicle on the map of the underwater terrain, and updating the first position value based on the coherent correlation.

In another aspect, the systems and methods described herein include methods for determining a navigational position of an underwater vehicle traversing an underwater terrain. The methods may include receiving a map including a synthetic aperture image of a portion of an underwater terrain being traversed by an underwater vehicle. The map including acoustic data, within a first frequency range, obtained from synthetic aperture sonar (SAS) imaging of the portion of the underwater terrain. The methods may further include predicting a first position value. The first position value may represent the location of the underwater vehicle on the map of the underwater terrain. The methods may include generating a synthetic aperture image of the portion of the underwater terrain by insonifying the portion of the underwater terrain with an acoustic signal within a second frequency range. The second frequency range may at least partially overlap with the first frequency range. In certain embodiments, the methods include modifying the synthetic aperture image by compensating for grazing angle errors to generate a grazing angle invariant synthetic aperture image, and correcting for phase errors in the grazing angle invariant synthetic aperture image, coherently correlating the modified synthetic aperture image with the map, and updating the first position value based on the coherent correlation.

In yet another aspect, the systems and methods described herein include methods for determining a navigational position of an underwater vehicle traversing an underwater terrain. The methods may include receiving a map including a synthetic aperture image of a portion of an underwater terrain being traversed by an underwater vehicle. The map may include acoustic data, within a first frequency range, obtained from synthetic aperture sonar (SAS) imaging of the portion of the underwater terrain. The methods include predicting a first position value, wherein the first position value represents the location of the underwater vehicle on the map of the underwater terrain, and generating a real aperture image of the portion of the underwater terrain by insonifying the portion of the underwater terrain with an acoustic signal within a second frequency range, wherein the second frequency range at least partially overlaps with the first frequency range. In certain embodiments, the methods include modifying the real aperture image by compensating for grazing angle errors to generate a grazing angle invariant real aperture image, and correcting for phase errors in the grazing angle invariant real aperture image, coherently correlating the modified real aperture image with the map, and updating the first position value based on the coherent correlation. In certain embodiments, at least one of the first frequency range and the second frequency range is from about 1 kHz-100 kHz. The first frequency range and the second frequency range may be less than about 80 kHz.

Figure 5A:
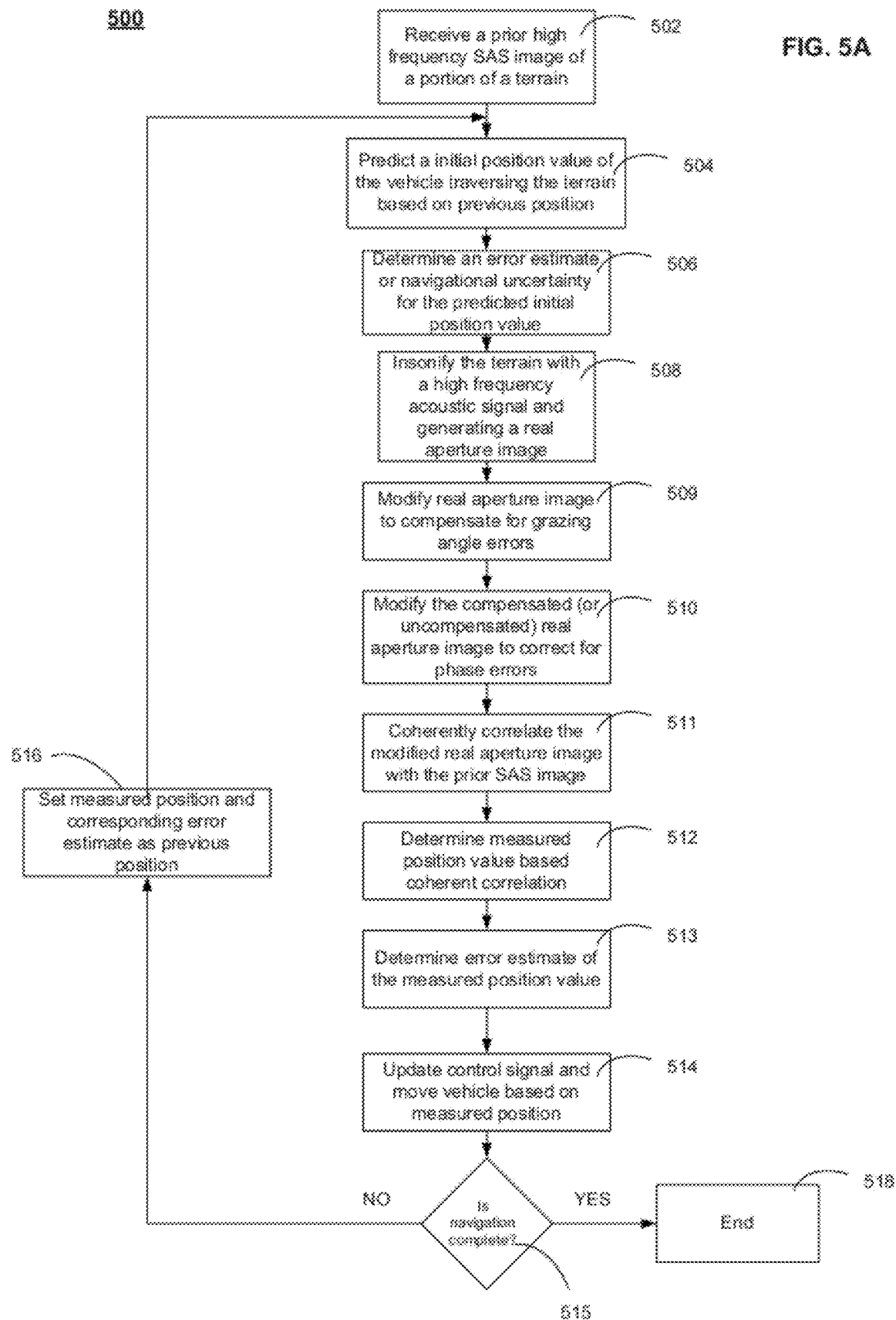
FIGS. 5A-5B depict a process for navigating a terrain using an exemplary high-frequency sonar navigation system, according to an illustrative embodiment of the present disclosure.
Figure 5B:
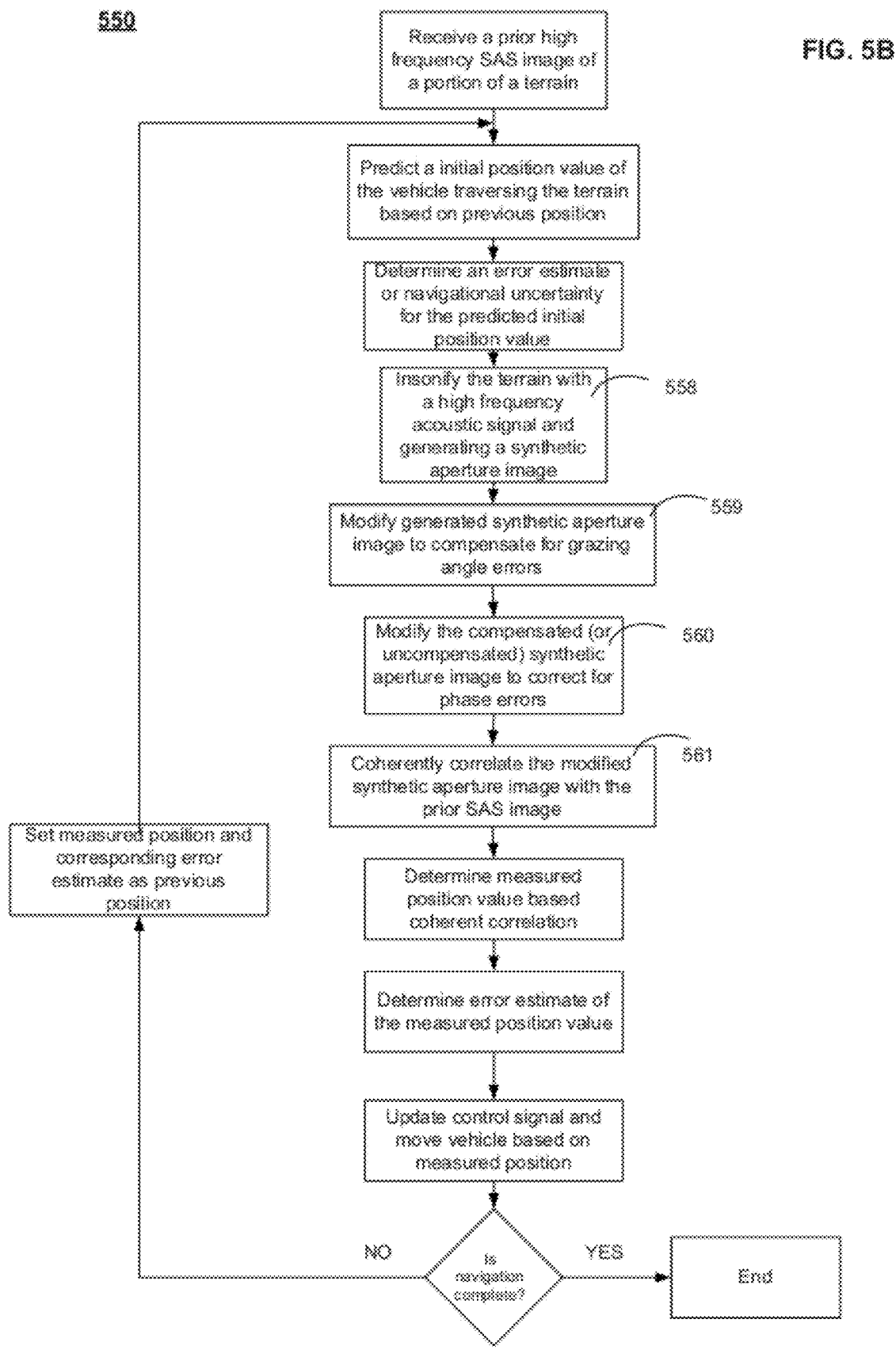

FIGS. 5A-5B depict processes 500 and 550 for navigating a terrain using an exemplary high-frequency sonar navigation system, such as system 100, according to an illustrative embodiment of the present disclosure. In particular, the processes 500 and 550 may be implemented across several components of system 100 of FIG. 1. The system 100 may receive via wire or wirelessly, at the map store 154, a prior high frequency SAS image of a portion of the terrain being navigated (step 502). The prior image may have been obtained using a frequency range greater than 100 kHz. For example, the frequency of the prior SAS image may include a well-formed image in the frequency range of 100 kHz-110 kHz, or between 110 kHz-120 kHz. The frequency of the prior SAS image may be between 100 kHz-150 kHz and/or 125 kHz-175 kHz and/or 175 kHz-225 kHz. The frequency of the prior SAS image may be greater than 500 kHz and in certain embodiments, the frequency may be greater than 1 MHz. In certain embodiments, the frequency ranges may be selected based on application. For example, for certain ocean systems, the frequencies may be up to about 500 kHz, and in certain medical ultrasound systems, the frequency may be about 15 MHz. In certain embodiments, the frequency ranges may be selected to be less than 100 kHz. In such embodiments, the process 500 may be especially beneficial depending on the ratio of the size of the error to the wavelength. In one example, for ships bouncing in waves process 500 may be beneficial for frequencies down below 10 kHz. The prior SAS image may be grazing angle compensated and/or phase error corrected and the frequency of the image may be post-grazing angle correction. In certain alternative embodiments, the prior image may include a low frequency image in the tens of kHz and less than 100 kHz.

The process 500 includes predicting, by the CCU 160, an initial position value of the vehicle traversing the terrain based on a previous position (Step 504). The position value may be represented in any suitable coordinate system. The CCU 160 may generate this initial position value based on information from the navigational controller 170 and previous motion. The CCU 160 may also determine an error estimate or navigational uncertainty associated with this initial position value (step 506).

The system 100 may insonify a portion of the terrain being navigated with a high-frequency signal and generate a current sonar image (step 508 in FIG. 5A, step 558 in FIG. 5B). In certain embodiments, CCU 160 in connection with the transmitter controller 118 may send transmission instructions to the transmitter 116 and the transducer array 112. To allow for coherent correlation, the frequency of imaging may be selected to overlap with the frequency range of the received prior map obtained in step 502. The overlap in frequencies may be a complete overlap, a partial overall or an implicit overlap. In a complete overlap, the frequency range of the current sonar image may lie completely within the frequency range of the prior map. In a partial overlap, the frequency range of the current sonar image may partially overlap with the frequency range of the prior map. Even when frequency ranges of the current raw imaging process and the prior mapping process do not overlap, there may still be an implicit overlap if the aspect or viewing angle of the two images are appropriately different. In such an implicit overlap scenario, the grazing angle compensated frequencies of the current image and the prior map at least partially overlap. For example, a 100 kHz signal at a 45 degree grazing angle would have the same projected wavelength as a 70.7 kHz signal at a grazing angle of zero and would consequently constitute an implicit overlap. As another example, a 100 kHz-110 kHz image at a relatively flat grazing angle may coherently correlate with a 110 kHz-120 kHz map at a relatively steeper grazing angle. Generally, the system 100 may operate as a SAS and obtain a high-frequency SAS image. To obtain a SAS image, the system 100 may operate in sectorscan mode, sidescan mode, stripmap mode and/or spotlight mode. System 100 may even operate as a phased array and obtain a real aperture image of the terrain.

The obtained current image, which may include a real aperture image, in step 508 in FIG. 5A or a synthetic aperture image, in step 558 in FIG. 5B, may be passed through pre-processor 120, matched filter 130 and received at the signal corrector 140. The obtained current image is modified to compensate for grazing angle by the grazing angle compensator 142 (step 509 in FIG. 5A, step 559 in FIG. 5B). Generally, the obtained current image is converted to a grazing angle invariant image. The grazing angle compensator 142 approximates the terrain (e.g., sea floor) as a smoothly undulating manifold with embedded point scatterers, and models the sonar signals as interference between point scatterer echoes. Shadowing and occlusion are generally neglected and changes in grazing angle are assumed to change the pitch of the echo. Changes in pitch generally cause all frequencies to be scaled by a multiplier which is the secant of the grazing angle. By reversing the process (i.e., projecting the echo onto the sea floor), a relationship between scatterer spacing and image frequency is established that is independent of grazing angle. Typically, grazing angle compensation is limited by transmitter design; the applicable range of angles is determined by signal bandwidth and transmitter properties.

The compensated obtained current image, which may be a real aperture image or a synthetic aperture image or any suitable sonar image, is then modified to correct for range varying phase errors by the phase error corrector 144 (step 510 in FIG. 5A, step 560 in FIG. 5B). The process of correcting for range varying phase errors, which allows for high-frequency imaging and navigation, is described in more detail with reference to FIG. 7.

The compensated and error corrected obtained current image of the terrain is coherently correlated, at the signal correlator 152, with the prior SAS map received at step 502 (step 511 in FIG. 5A, step 561 in FIG. 5B). Generally, because image intensities can spatially vary, the signal detector 150 may be configured to perform a normalized correlation. In certain embodiments, the normalized correlation may be performed by calculating the correlation coefficient. Generally for sonar images, the correlation coefficient is often low (less than 0.1) and the values depend on the available structure. Without a priori knowledge of the terrain, it is difficult to define detector thresholds. Detection may still be possible, however, because signal to noise ratios (SNR) may be high. The signal detector 150 may calculate additional statistics of the normalized correlation include the statistical distributions of the signals (amplitude and phase) and/or noise. The statistical distributions may include Rayleigh and/or Gaussian distributions. The detector thresholds may be selected based on the distribution. Examples of suitable correlation techniques included in signal detector 150 techniques described in "On Correlating Sonar Images," Richard J. Rikoski and J. Tory Cobb and Daniel C. Brown, Robotics: Science and Systems'05, 2005, and "Holographic navigation," Richard J. Rikoski and Daniel C. Brown, ICRA'08, 2008, the entire contents of each of which are incorporated herein by reference.

Using the coherent correlation of the image with the map, the CCU 160 may determine a measured position value (step 512) and the associated error estimate of the position (step 513). Certain exemplary techniques to determine measured position are described in "Holographic navigation," Richard J. Rikoski and Daniel C. Brown, ICRA'08, 2008, the entire contents of which are incorporated herein by reference.

Based on the new position estimate, the CCU 160 may update control signals and instruct the motor controller 180 to move the vehicle accordingly. If navigation to a new location is complete (step 515), the previous map-based calculated position is set as the previous position (step 516) and the process 500 is repeated at the new position.

In some embodiments, traditional SAS navigation may robustly and easily solve for position, but may less efficiently solves for heading, e.g., of an unmanned autonomous vehicle. It may be possible to correlate a synthetic aperture image against either a real aperture or synthetic aperture image at various angles to estimate the heading, but this may be computationally intensive. The proposed system may solve this problem by decomposing the heading estimation problem into a two step process. First, holographic navigation is used to estimate position. Then, a correlation is performed using an angular coordinate system centered on the estimated position. Assuming range is r and angle is θ, a coordinate system which is a function of r and θ is used for correlation. In the simplest instantiation, (f(r), g(θ))=(r, θ), but alternatives like f(r)=horizontal distance along the bottom or g(θ)=sin(θ) may also be appropriate. The correlation may either be in range and angle or just in angle, but to detect heading it may be necessary to correlate in angle. The angle with the maximum correlation corresponds to the direction the reacquisition sonar is facing. Two exemplary processes for solving for heading are processes 600 and 650 illustrated in FIG. 6A and FIG. 6b, respectively. Processes 600 and 650 may be similar to processes 500 and 550, respectively, except for the step of determining heading based on measured position value as shown in step 602 in FIG. 6A and step 652 in FIG. 6B.

As noted above, the system 100 includes a phase error corrector 144 to correct for range varying phase errors. Range varying phase errors may lead to low correlation values when correlating between two high frequency images (e.g., an image and a map). As an illustrative example, suppose a robot with a high frequency sonar attempts to correlate its imagery with a prior map but it has a 1 cm altitude error and a 1 cm wavelength. Directly underneath the vehicle this leads to a 2 cm path length error, or 2 cycles. At long range, this leads to a zero cycle delay. Consequently, if the prior sonar image and the conjugate of the new sonar are multiplied together but not summed (image1*conj(image2)) what will be observed is a range varying phase that is due to that altitude error. When the multiplied images are summed together this range varying phase error will cause destructive interference, leading to a very low correlation value.

Similarly, as a second illustrative example, assume a 0.01% sound speed error, a 1 cm sonar, and an operating altitude of 5 meters. The travel path directly under the vehicle is 10 meters, or 1000 cycles, leading to a $\frac{1}{10}^{th}$ of a cycle error. At a range of 50 meters (or 10,000 cycles) this leads to a full cycle error. At a range of 500 meters this leads to 10 cycles of error. So again, when the multiplied sonar images are summed constructive interference will drive the cross correlation down. High frequency holographic navigation attempts to solve these problems by either using image pieces which are small enough to be immune to those effects, or by estimating and correcting for those biased parameters.

One method of correcting for phase error is to cut the image into small regions where the phase error is constant and use those as independent measurements. In regions with very high signal-to-noise ratio (SNR) this may be very efficient. FIG. 7 depicts a process 700 for correcting range varying phase errors in a high-frequency sonar system, according to an illustrative embodiment of the present disclosure. The process 700 may be implemented on phase error corrector 144 of the signal corrector 140 in system 100 of FIG. 1. The process 700 begins with receiving a real aperture image or synthetic aperture image (step 702). In certain embodiments, the real aperture image may be modified with grazing angle compensation. The phase error corrector 144 may estimate the range varying phase error of the entire received real aperture image (step 704). The phase error corrector 144 may then determine if the variation in phase error across the image is less than an error threshold (step 706). The error threshold may be set as desired. In certain embodiments, the error threshold may be set depending on the maximum range of the real aperture image. If the variation in phase error across the image is greater than the error threshold then the image may be split into sub-regions (step 708). The phase error corrector 144 may split the image into sub regions as desired. The sub-regions may be of equal sizes or of different sizes. Sub-regions may be of varying sizes such that the size variation may be based on the range. The phase error corrector 144 may estimate the phase error for each sub-region (step 712), and determine if the variation in phase error across each subregion is less than a phase error threshold (step 714). The error threshold for subregions may be the same as or different from (greater than or less than) the error threshold associated with step 706. The error thresholds for each subregion may be different or the same. If the phase error in a particular subregion is less than the error threshold, that particular subregion may be corrected for the corresponding phase error, which is substantially constant across the entirety of the particular subregion (step 715). If the phase error is greater than the threshold then the subregion may be split into smaller subregions and steps 708, 712, 714 may be repeated. In certain embodiments, the subregions may be selected such that they have constant altitude phase error or constant sound speed error. One or more selected subregions in one or more sensitive mapping regions may be selected to have the largest possible size.

In certain embodiments, suppose system 100 can correlate small patches (e.g., 50 pixels by 50 pixels). In such example, if the image is 1000 by 1000 pixels, then system 100 may cut the image up into 20×20 regions of 50×50 pixels each. The system 100 may perform 400 separate correlations. Each correlation may have a peak with a slight shift and a slightly different phase value due to the unknown error function. System 100 may take the absolute value of each correlation and sum them all together to eliminate destructive interference due to the phase differences. Such an approach may be advantageous at least when the error function is unknown. Also, although the noise may be Rayleigh distributed when the distribution of the absolute value for a single image correlation is viewed, but when system 100 sums a large number together the law of large numbers applies and the noise becomes Gaussian distributed.

The system 100 may include other methods for compensating for phase errors. In certain embodiments, the real image is taken and a sum of the envelopes of small image correlation regions with approximately stationary phase is calculated before calculating a probability density function based on that sum. This may be similar to a speckle reduction technique used in imaging methods. The sums can either be for a single altitude solution or for multiple altitude solutions; if multiple altitude solutions are used then the technique measures altitude bias. In certain embodiments, using the envelope only (the absolute value of the correlation result) removes the relative phase differences between correlation results. It is important to note that summing together a large number of correlation images results in a transition from Rayleigh to Gaussian distributed speckle intensity; this difference may be important when converting the correlation result to a probability density function. Previous holographic navigation techniques, which use the Rayleigh distribution, typically fail when presented with correlation results based on sub-image summation; switching to a more representative distribution is key. When a small number of images are summed together the distribution may not yet be fully Gaussian and may be better represented by some other distribution such as a K-distribution.

In some embodiments, patches may be used with roughly stationary phase to estimate the range varying phase error and then apply an appropriate correction so as to enable full waveform correlation. In some embodiments, estimating the range varying phase error may be done several ways, including, inter alia, unwrapping the phase and fitting a curve, doing a least squares fit to the raw angles, or changing coordinate systems and using a Fast Fourier Transform (FFT) or any type of fourier transform such as a Discrete Fourier Transform (DFT) or a wavelet transform to find the delay. This embodiment (combining a coordinate system change and an FFT) is applicable to time delay estimation beyond holographic navigation (for instance, to motion estimation for synthetic aperture systems using displaced phased center navigation, especially for heave estimation).

In one example of a heave estimation technique includes the following:

$$t = \frac{2r}{c} = \frac{2\sqrt{x^2 + z^2}}{c}$$

Where t=time, r=range, c=sound speed, x=horizontal range and z=altitude.

$$x = \sqrt{\frac{c^2 t^2}{4} - z^2}$$

$$\frac{dx}{dz} = -\frac{z}{\sqrt{\frac{c^2 t^2}{4} - z^2}} = -\frac{z}{x}$$

$$x' \cong x + e_x + \frac{dx}{dz}e_z = x + e_x - \frac{z}{x}e_z$$

Where $e_x$=x error, $e_z$=z error, s~=envelope function, $k_{x0}$=wavenumber of carrier frequency.

Convert s(t)→s(x)

Now, s1(x1)!=s2(x2) because of error ($e_x$, $e_z$). So when you multiply s1(x1) by the conjugate of s2(x2), the signals differ by an offset:

$$x2 = x1 + e_x - \frac{z}{x1}e_z$$

$$x2 - x1 = e_x - \frac{z}{x1}e_z$$

Now, $e_x$ is usually pretty easily observable and removable, getting you to a range varying error:

$$x2 - x1 = -\frac{z}{x1}e_z$$

The signals are now $$s1(x) = \tilde{s1}(x)e^{jk_{x0}x}$$

$$s2(x) = \tilde{s2}(x)e^{jk_{x0}x} = \tilde{s1}\left(x + \frac{dx}{dz}e_z\right)e^{jk_{x0}\left(x + \frac{dx}{dz}e_z\right)}$$

$$s1(x)s2^*(x) = \tilde{s1}(x)\tilde{s2}(x)e^{-jk_{x0}\frac{dx}{dz}e_z}$$

$$s1(x)s2^*(x) = \tilde{s1}(x)\tilde{s2}(x)e^{jk_{x0}\frac{z}{x}e_z}$$

Now, changing into a new coordinate system $$\sigma = \frac{k_{x0}z}{x}$$

changes this into $$s1(\sigma)s2^*(\sigma) = \tilde{s1}(\sigma)\tilde{s2}(\sigma)e^{j\sigma e_z} \cong \tilde{s1}(\sigma)^2 e^{j\sigma e_z}$$

From here, we can do a Fourier transform to estimate $e_z$.

In certain embodiments one or more techniques employed by the signal corrector 140 or any other component of system 100 may be used in certain applications including, but not limited to, change detection and two pass interferometry. Change detection is typically a process of taking two passes by a scene, then accurately aligning two images, and coherently comparing them. In regions where there has been "change" they may decorrelate significantly. Two-pass interferometry is typically a process of taking two passes over a scene, aligning two images and comparing the phase of these two images. The comparison of phase of two images may reveal changes and deformation in the terrain. In certain embodiments, such deformation may be over timespans of days to years. Such applications may be useful for geophysical monitoring of natural hazards, such as earthquakes, volcanoes and landslides, and also in structural engineering, including monitoring of subsidence and structural stability. Other applications of system 100, and particularly signal corrector 140, include reconnaissance, surveillance and targeting. These applications may use system 100 to generate high resolution images and to distinguish terrain features (surface and/or underwater) and to recognize and identify selected man made targets. Still other applications include interferometry, navigation, guidance, imaging foliage and underground or subsurface targets, detecting and moving targets, and environmental monitoring application such as monitoring oil spills.

They systems and methods described herein may be adapted as desired for both sonar and radar systems. For example, sonar transducers may be replaced with suitable radar transducers, and one or more components may be modified, added to or removed from the systems described herein to operate in a sonar and radar regime. In some embodiments, the systems and methods may be configured to operate as both sonar and radar devices, without departing from the scope of the present disclosure. In certain embodiments, when the systems and methods are configured for sonar imaging, the frequencies may be in the range from 100 kHz to about 200 kHz. In certain embodiments, when the systems and methods are configured for radar imaging, the frequencies may be in the range from 1 GHz to about 30 GHz. Generally, the systems and methods described herein may be applied for any frequency range, without departing from the scope of the present disclosure.

Certain Applications of High-Frequency Holographic Mapping and Navigation Systems The systems and methods described here make use of various other aspects of the holographic nature and high frequency of synthetic aperture images, which inventor has recognized. For example, systems and methods are described herein for determining a three-dimensional model of a shape based on its two dimensional shading and shadowing of acoustic signals. In some embodiments, traditional shape from shading may be one parameter shy of a solution; an approximation may be required in order to derive a three dimensional model from a pure image. However, since a synthetic aperture image is a quasi-hologram and contains a continuum of images of a range of angles, it may contain enough information to over-constrain the shape from shading problem. The systems and methods above described solve the shape from shading problem by decomposing the SAS image into lower resolution sub-patches and then deriving their orientation from the shading observed from multiple vantage points.

The systems and methods described herein include methods for positioning sensors (such as Tsunami sensors) and navigation beacons with high-precision using HF holographic navigation. In certain embodiments, Tsunami buoys use sensors on the seafloor to small variations in water pressure. To make accurate measurements it is necessary that the sensor be positioned properly on the seafloor. If the sensors are hidden behind rocks or are not level/well placed on the sea floor it can affect the accuracy of their measurements. The systems and methods described herein combine a holographic navigation system, and maneuvering system, and a tsunami sensor so that tsunami sensors can be positioned very precisely using a prior map.

In some embodiments, holographic navigation enables very high precision navigation relative to the seafloor, but may be limited by the necessity of periodically observing the seafloor. Midwater system that may be at a great altitude to observe the seafloor cannot take advantage of holographic navigation or its precision. The systems and methods described herein address this limitation by combining a beacon system, and maneuvering system, and a holographic navigation system. The beacon is able to position itself very precisely, enabling systems including long baseline navigation or ultrashort baseline navigation without needing to calibrate the beacon system using a ship.

The systems and methods described herein include methods for monitoring and modeling a water column using an autonomous underwater vehicle (AUV) based on high-precision location measurements obtained using HF holographic navigation. In some embodiments, AUVs either circle a buoy or simply form a wagon wheel. By transmitting orthogonal signals to one another they can measure time of flight between positions and also measure differential time of flight. From time of flight, it may be possible to determine the sound speed of the water; from differential time of flight it may be possible to determine the Doppler shift along the connecting vector/estimate water velocity. Vehicle positions are determined using holographic navigation, thereby enabling a high precision model of the water column in post processing. Vehicles may dock at a central buoy for recharging.

In some embodiments, AUV vehicle recovery and vehicle docking may be difficult problems due to the dynamic nature of both the vehicle and the destination. If it can be decomposed into a purely relative problem, the vehicle needs its position relative to the dock as well as its orientation. The systems and methods described herein allow a vehicle to passively estimate its non-range position relative to a docking system passively, and allows it to estimate its range to the docking system actively.

In some embodiments, the system takes advantage of the fact that a blazed array transmits different frequencies at different angles. Using two blazed arrays with different frequencies oriented orthogonally it creates a two dimensional grid of frequencies. For instance, suppose a 300-600 kHz blazed array was oriented such that the frequencies varied with horizontal displacement, and a 600-1200 kHz blazed array was oriented such that its frequencies varied in the vertical direction. A vehicle observing 450 kHz and 900 kHz would be driving straight into the dock. A system observing 500 kHz and 900 kHz would have the correct elevation but would be displaced horizontally. A system observing 450 kHz and 950 kHz would be displaced vertically. In some embodiments, to measure the vehicle's orientation with respect to the docking station, the vehicle would have a small passive array to measure the direction of the incoming signal from the blazed arrays.

In some embodiments, range may be measured using a small beacon system such as an ultrashort baseline beacon. In some embodiments, range may be measured using high frequencies that are only observable at short ranges, or may be neglected entirely (purely a glide path based docking method).

Seismic Survey System Using Planar SAS and Holographic Navigation

Seismic survey is generally a form of 2D or 3D geophysical survey that is used to measure terrestrial or extra-terrestrial properties by means of acoustics or electromagnetic. Seismic survey systems are necessary for offshore oil exploration, but they are large, ship intensive, expensive, and high power. Traditional seismic survey systems use very high powered transmitters to insonify the bottom, and receive the signal on a network of towed arrays which are dragged behind a large ship.

In certain embodiments, the systems and methods include a seismic survey system having a combination of orthogonal transmitters and multiple receivers to form a full planar synthetic aperture sonar with higher resolution, lower power, and fewer large ships than a traditional seismic survey system.

In certain aspects, the systems and methods described herein include system for surveying an underwater terrain. The systems may include a first number of a plurality of acoustic transmitter elements mounted on one or more vehicles, and a second number of a plurality of acoustic receiver elements mounted on one or more vehicles. Each of the vehicles may include a processor having a synthetic aperture image of a portion of the underwater terrain. The synthetic aperture image may include acoustic data obtained from prior synthetic aperture sonar imaging of the portion of the underwater terrain. In certain embodiments, the plurality of vehicles are arranged to form a planar synthetic aperture sonar array having a third number of phase centers. In such embodiments, the third number of phase centers is equal to the first number multiplied by the second number. The transmitters in such systems may be configured to generate orthogonal acoustic signals.

In certain embodiments, the vehicles include underwater vehicles and/or surface vehicles. The one or more vehicles may be positioned based on a mapping against the prior synthetic aperture image of the portion of the underwater terrain.

The transmitter elements and receiver elements may operate at frequencies in a range from about 1 Hz to about 10 kHz. In certain embodiments, the transmitter elements and receiver elements operate at frequencies in a range greater than about 10 kHz. In certain embodiments, the transmitter elements and receiver elements operate at frequencies in a range from about 10 Hz to about 1 kHz.

The processor may be further configured for determining at least one of a property of an underwater surface. The underwater surface may include at least one of the seafloor, subsurface hydrocarbon deposit, and subsurface magma chamber.

Applicants' system takes advantage of the phase center approximation of synthetic aperture sonar (SAS). A phase center is located halfway between the transmitter and receiver. For an array to be fully populated (from a Nyquist perspective) it needs to have an appropriate number of properly spaced phase centers.

In certain embodiments, system 100 includes multiple transmitters. Using multiple transmitters with orthogonal signals, it may be possible to distinguish between phases created by different transmitters. Therefore, by using M transmitters and N receivers, it is possible to create MN phase centers. This is often less expensive than using one transmitter and MN receivers. In certain embodiments, the system 100 generalizes to any practical value of M and N.

The transmitters of the system can be mounted on any sort of vessel or robot (ship, autonomous underwater vehicle (AUV), unmanned surface vehicle (USV), nuclear submarine, etc). In certain embodiments, the transmitters of the systems described herein may require a relatively high power. In such embodiments, the vessel may be equipped with suitable power delivery systems to supply the needed power to the transmitters. One example of a vessel includes modest sized USVs such as 10 m RHIBs (Rigid Hull Inflatable Boats) since autonomous systems are ideal for maneuvering in formation and surface craft enable the use of GPS.

In certain embodiments, system 100 includes multiple receivers. The receivers of the system can be mounted on various vehicles and use various array types without dragging arrays behind ships (even though this is possible). In some embodiments, AUVs are flown in formation close to the bottom. This reduces losses on the return path, reduces the necessary transmit power, and allows the receivers to be precisely positioned using holographic navigation. Holographic navigation in this manner requires a prior seabed survey of the area, but this is relatively inexpensive.

In some embodiments, the combination of transmitters and receivers form a line array of phase centers. That line array is then translated orthogonally to its axis in a predominantly horizontal direction, so that when the data is accumulated there is a Nyquist sampled planar array. Using that planar array it may be possible to beamform the signal to form a 3D image composed of high resolution voxels penetrating deep into the seabed.

Generally, for seismic survey applications, system 100 may be operated at any suitable frequency without departing from the scope of the present disclosure. For example, system 100 may be configured for frequencies in the range of 1 Hz to about 10 kHz. The system 100 may be generally configured for frequencies less than 10 kHz, including frequencies in the range of 100 Hz to about 10 kHz. In certain embodiments, system 100 may be adapted with electromagnetic transducers and suitable components for radar-based seismic applications. In such applications the frequencies may range from about 300 MHz to about 30 GHz. Whether configured to operate for radar or sonar based applications, system 100 may use frequencies in any suitable range without departing from the scope of the invention.

They systems and methods described herein may be adapted as desired for both sonar and radar systems, and accordingly for both synthetic aperture sonar (SAS) and synthetic aperture radar (SAR) systems. For example, sonar transducers may be replaced with suitable radar transducers, and one or more components may be modified, added to or removed from the systems described herein to operate in a sonar and radar regime. In some embodiments, the systems and methods may be configured to operate as both sonar and radar devices, without departing from the scope of the present disclosure. In certain embodiments, when the systems and methods are configured for sonar imaging, the frequencies may be in both high and low frequency ranges in the range from 10 Hz to about 1 kHz. In certain embodiments, when the systems and methods are configured for radar imaging, the frequencies may be in the range from 1 MHz to about 100 MHz. Generally, the systems and methods described herein may be applied for any frequency range, without departing from the scope of the present disclosure.

Low Grating Sidelobe SAS

The systems and methods described herein include adding multiple transmitters and generating orthogonal pinging sequences configured to enhance the performance of a SAS system. In particular, the systems and methods described herein include a SAS having a low-grating sidelobe (as described with reference to FIGS. 8-9B), a SAS having a high coverage rate using multiple transmitters (as described with reference to FIG. 10-11C), and an overpinging sequence for increasing the range of the SAS system.

In general, grating sidelobes occur when active sonar elements are one or more wavelengths apart. Grating sidelobes may not be fully suppressed when elements are more than a half wavelength apart. For most active sonar systems this spacing is impractical, since it would require an extremely high channel count and omni-directional elements. Instead, most systems use larger transducer elements with limited beam patterns. The resulting beam pattern of the sonar system is the product of the array beam pattern (including grating lobes) and the beam pattern of the individual elements. Since those elements output relatively little in the direction in the direction of the grating lobes, this spacing partially suppresses the lobes. According to one illustrative embodiment, the transmitter and receiver elements have a relevant dimension (e.g, width) d, and assuming a phase center approximation (the ellipsoidal travel path between transmitter and receiver is modeled as a range circle centered halfway between the transmitter and receiver), the classical SAS array has "d/2" spacing, as shown in FIG. 9A.

According to the illustrative embodiment of FIG. 9B, one may arbitrarily increase the array sampling from d/2 to something higher (e.g., d/4), as shown. This spacing takes advantage of the fact that a synthetic aperture sonar system is in constant motion so that it can accumulate many pings/phase centers so as to create a very high resolution image. The system then operates by transmitting orthogonal signals after a very short delay to create additional phase centers in between the original phase centers so that they can be added in processing to create an array with d/2N sampling, where N>1. In effect, the SNR is no longer grating lobe limited.

FIG. 8 depicts a process 800 for using a plurality of orthogonal signals in a synthetic aperture sonar (SAS) system, such as system 100, to generate images, according to an illustrative embodiment of the present disclosure. In particular, process 800 may be configured to use orthogonal signals to generate SAS beams having suppressed grating lobes. Process 800 begins with providing a SAS array (such as array 112 of FIG. 1) having a transmitting element and plurality of receiving element (step 802). Such an array is depicted in FIGS. 9A and 9B. In certain embodiments, each of the transmitting and receiving elements may have a first dimension, d. The dimension may include any suitable dimension including length, width and diameter. A user or CCU 160 may determine the number of orthogonal pings, N (step 804). As noted above generally N>1. In certain embodiments, N=2, such that the sampling is about d/4. Each ping p(i)={p1, p2 ..., pn} has a duration of Tp. In certain embodiments each ping may be orthogonal to one or more previous pings such that pings overlapping in time are orthogonal to each other and non-orthogonal pings do not overlap with each other. The CCU 160 or the transmitter controller 118 may calculate a first effective spacing D=d/2, representative of an effective distance between transmitter and receiver elements during motion.

According to process 800, the transmitter controller 118 instructs the transmitter 116 to set time to t0 and start transmitting the ping p(i), where i=1 (step 808). The transducer array 112 is moved along an axis parallel to that connecting the receiving elements (step 810). In certain embodiments, it may be acceptable for the face of the transmitting elements or projectors to not be coplanar to the face of the receivers. For example, streamlined vehicles include a polyurethane coating continuous with the body form, however the actual transmitting elements may be embedded about 1-2 inches behind that polyurethane window. The CCU 160 determines if the transducer array 112 has moved a distance of D/N (step 812). If the transducer array 112 has moved a distance of D/N, then the CCU 160 determines if all the pings have been transmitted in the current iteration (step 814). If all the pings have not been transmitted then, the next ping (which is orthogonal to the previous ping) is transmitted and the process is repeated from step 810. For example, if N=2, the transmitter width is d=0.1 m, the robot is translating at 1 meter per second, the time period between the first ping in each cycle is 1 s, and the pulse length is 0.2 s, one implementation of the process 800 includes firing the first ping at time t=0. At time, t=0.025 s, the transducer 112 may have translated a distance of d/4. At time, t=0.025 s, the transducer 112 may be configured to fire the second orthogonal ping. Between 0.025 s and 0.2 s, both the first ping and the orthogonal second ping are transmitting. Between 0 s and 0.025 s, only the first ping is transmitting, and between 0.2 s and 0.225 s, only the second orthogonal ping is transmitting.

Generally, and not to be bound by theory, the process allows for delaying the transmission of the second signal until the vehicle has translated enough to create a second virtual array. As was shown in process 800, the delay may be related to vehicle speed and firing may be adjusted based on the measured motion while keeping the vehicle speed constant ("slave to speed" configuration). In certain other embodiments, the delay may be fixed and the vehicle speed may be adjusted, including performing alongtrack compensation. In another configuration, the matched filter length may be adjusted slightly to compensate for alongtrack motion imperfections when defining phase centers (e.g. in the above example transmitting a noise sequence, but then dropping the first 0.001 s to 0.00001 s of the matched filter template to correctly place the effective vehicle ping start position.

Consider an exemplary system with a 1 meter long broadside array consisting of 10 centimeter elements and a 10 cm transmitter. The virtual array of phase centers is then 50 cm long with phase centers spaced 5 cm apart. In a typical SAS, the vehicle would transmit, move 50 cm, and transmit again. For a variant of the present disclosure operating with d/4 spacing, the vehicle would transmit, move 2.5 cm, transmit an orthogonal signal (so as not to jam the original signal), move an additional 47.5 cm, and then repeat. If the vehicle was moving at 1 m/s, the delay between signals would be 1/40 of a second, or 25 ms. If the transmit signal is longer than 25 ms then the two orthogonal signals will overlap. In this case, the signals need to be designed such that when they are summed together they do not saturate the transmitter. If the goal is higher sampling that d/4, it may be necessary to sum together multiple signals.

This method is not only restricted to broadside synthetic aperture sonar. Broadside active phased arrays may use this technique to form very short aperture synthesis to reduce sidelobes (i.e. a sidescan sonar would fuse two pings). Real aperture and synthetic aperture forward looking and/or squinted sonars may use the same technique to increase their element count. The technique would work very well with circular SAS arrays.

Then the signal can be changed from ping to ping to further reduce sidelobes after aperture synthesis and to suppress noise from the orthogonal signals. This is manifested in several ways, including. Changing a ping changes its autocorrelation function during aperture synthesis; summing together different autocorrelation functions with different sidelobe structures will reduce the relative magnitude of those sidelobes. Changing the ping changes the cross correlation function between the two subcomponent pings so that during aperture synthesis, the noise is not locally a standing wave and instead destructively interferes.

They systems and methods described herein may be adapted as desired for both sonar and radar systems. For example, sonar transducers may be replaced with suitable radar transducers, and one or more components may be modified, added to or removed from the systems described herein to operate in a sonar and radar regime. In some embodiments, the systems and methods may be configured to operate as both sonar and radar devices, without departing from the scope of the present disclosure. In certain embodiments, when the systems and methods are configured for sonar imaging, the frequencies may be in both high and low frequency ranges in the range from 10 kHz to about 200 kHz. In certain embodiments, when the systems and methods are configured for radar imaging, the frequencies may be in the range from 100 MHz to about 30 GHz. Generally, the systems and methods described herein may be applied for any frequency range, without departing from the scope of the present disclosure.

High Coverage Rate SAS

Figure 11C:
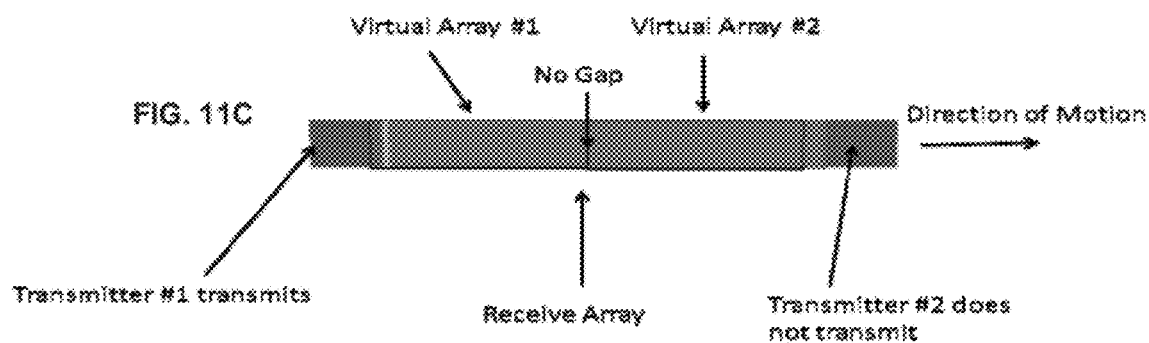

In certain embodiments, the present disclosure relates to a device for a synthetic aperture sonar with a real array with N elements of size d which combine to create a real array of length L. Because of the phase center approximation, the effective position of the elements is halfway between the transmitter and receivers, making the effective array length L/2. This effective array will be referred to as a virtual array, as shown in FIGS. 11A-C. In some embodiments, if two vertically displaced transmitters are used which transmit orthogonal signals, it may be possible to create two vertically displaced virtual array and perform interferometry. One example of vertically displaced transmitters is described in U.S. Pat. No. 8,159,387, entitled "Multi-transmitter Interferometry," the contents of which are incorporated herein by reference in their entirety.

In some embodiments, if M vertically displaced transmitters are used, it is possible to create M virtual arrays. In some embodiments, if two horizontally separated transmitters spaced L apart are used, it is possible to create two abutting virtual arrays giving the vehicle an effective array length of L. One example of a multi-transmitter array is described in U.S. Pat. No. 5,295,188 entitled "Synthetic Aperture Side-Looking Sonar Apparatus," the contents of which are incorporated herein by reference in their entirety. In some instances, SAS may use two transmitters placed away from the receive array to achieve this effective array length. Doubling the array length is generally desirable since it doubles the area coverage rate of a SAS. (Since the vehicle moves one effective array length between pings, if the array length doubles the range of the sonar doubles. If the robot maintains its ping rate, it must double its velocity in order to be in position for the subsequent ping. In either case, the coverage rate doubles.)

Inventor has recognized that placing a pair of transmitters away from the array spaced L apart results in an effective sonar array length of L (which is greater than prior art systems that have an effective array length of L/2). The transmitters are typically placed away from the array because if they are placed on either side on the receive array they will not be L apart, but L+D. This spacing results in virtual arrays which may have a missing element, resulting in grating sidelobes.

Inventor's method allows for a more flexible placing of transmitters, allowing for a larger area coverage rate in a smaller package. The method includes using multiple transmitters with orthogonal signals fired non-synchronously and using delays and vehicle translation to form abutting virtual arrays. For a simple array of N elements of size d, with transmitters of size d on either side of the array, the forward transmitter will start transmitting first, followed by a delay as the vehicle moves d/2 forward, then the aft transmitter starts firing as shown in FIGS. 11A-C. If, for technical reasons, the transmitters have a different spacing, the timing may be adjusted accordingly.

In certain aspects, the systems and methods described herein include methods for generating a synthetic aperture sonar (SAS) signal. The methods may include providing a sonar array having a receiver array, comprising a plurality of receiver elements arranged along a first axis, and including a first end and a second end. The sonar array may include first transmitter element and a second transmitter element. The first transmitter element, the second transmitter element and the plurality of receiver elements each may have a first width. The methods may include generating, using the second transmitter element, a first acoustic signal at a first position, and moving the sonar array to a second position along the first axis in a direction from the first end to the second end of the receiver array. The second position may be at a distance of about one-half the first width from the first position. The methods may include generating, using the first transmitter element, a second acoustic signal at the second position, such that the second acoustic signal is orthogonal to the first acoustic signal.

In certain embodiments, the sonar array is mounted on a vehicle such that a length of the sonar array is less than a length of the vehicle, and the second position is offset from one-half the first width from the first position by less than the length of the vehicle. In other embodiments, the sonar array is towed by a vehicle such that a length of the sonar array is greater than a length of the vehicle, and the second position is offset from one-half the first width from the first position by less than the length of the sonar array. Generally, the second position may be located at any suitable location without departing from the scope of the present disclosure.

The sonar array may further comprise an additional transmitter, and the method may further include generating a third acoustic signal at a third position. In certain embodiments, the first transmitter element is disposed proximate the first end of the receiver array, and the second transmitter element is disposed proximate the second end of the receiver array.

In certain embodiments, at least one of the first and second acoustic signals has a frequency in range from about 100 Hz to about 100 kHz. At least one of the first and second acoustic signals may have a frequency in range greater than about 100 kHz The sonar array may be disposed on at least one of an underwater vehicle or a surface vehicle for imaging an underwater terrain. In certain embodiments, the sonar array may be disposed on at least one of an aerial vehicle or a terrestrial vehicle for imaging a terrestrial terrain.

In another aspect, the systems and methods described herein include systems for generating a synthetic aperture sonar (SAS) signal. The systems may include a sonar array having a receiver array, comprising a plurality of receiver elements arranged along a first axis, and including a first end and a second end, a first transmitter element disposed proximate the first end of the receiver array, and a second transmitter element disposed proximate the second end of the receiver array. The first transmitter element, the second transmitter element and the plurality of receiver elements may each have a first width. The systems may include a processor for generating, using the second transmitter element, a first acoustic signal at a first position, moving the sonar array to a second position along the first axis in a direction from the first end to the second end of the receiver array, wherein the second position is at a distance of about one-half the first width from the first position, and generating, using the first transmitter element, a second acoustic signal at the second position. The second acoustic signal may be orthogonal to the first acoustic signal. In certain embodiments, one or more transmitters for generating one or more additional acoustic signals.

In some embodiments, the method allows for a multitude of transmitters placed along the vehicle. For instance, if four transmitters were used spaced L apart (for a total length of 3L), the effective array length is 2L, and the area coverage rate of the system quadruples over a baseline SAS. In some embodiments, if M transmitters are used to lengthen the array, the area coverage increases to M times the baseline coverage. Likewise, pairs (or larger sets) of vertically displaced transmitters may be added to create a longer interferometric array. In the event that the separated along track transmitters cannot be placed in the same vertical position, resulting in virtual arrays that are parallel but not collinear, grazing angle compensation can be used to correct for the vertical displacement. Changing the orthogonal signals used by the transmitters from ping to ping may further reduce noise suppression, which may be desirable. In certain embodiments, it may be desirable to fire channels nearly simultaneously to lengthen the array. In such embodiments, projectors may be positioned at 0 (e.g., the fore end of the receiver array) and L+w (e.g., the aft end of the receiver array), and other places at approximately (k+/−delta)*L where k is an integer and delta is some acceptable variation. Delta may correspond to a delay that is less than the time before the bottom bounce.

FIG. 10 depicts a process 1000 for transmitting pulses from a SAS system having such a multiple transmitter arrangement, according to an illustrative embodiment of the present disclosure. The process 1000 begins with proving a transducer array having a receiver array with a plurality of receiver elements and two transmitter elements (step 1002), each having a width, w. In certain embodiments, the transmitting elements are positioned on either side of the receiver array and along the axis of the receiver array, such as the array depicted in FIGS. 11A-C. Transmitter T1 may be position in the aft position and transmitter T2 may be positioned in the fore position such that the vehicle moves in a fore direction. The transmitter T2 may ping first (step 1004), after which the vehicle may move fore alongtrack and along the array axis connecting T1 and T2 (step 1006). The sonar system 100 may determine if the sonar array has moved a distance w/2 (step 1008). Once the sonar system 100 has moved such a distance, the transmitter T1 may ping, such that T1's ping is orthogonal to T2's previous ping (step 1010). The vehicle may then move fore alongtrack (step 1012), and the sonar system 100 may once again query whether the distance traveled is equal to w/2 (step 1014). If such a distance has been traversed, the process 1000 may be repeated from step 1004 and T2 may ping again. If the transmitters of width w were spaced further from the array then the delay would need to be slightly greater.

They systems and methods described herein may be adapted as desired for both sonar and radar systems, and accordingly for both synthetic aperture sonar (SAS) and synthetic aperture radar (SAR) systems. For example, sonar transducers may be replaced with suitable radar transducers, and one or more components may be modified, added to or removed from the systems described herein to operate in a sonar and radar regime. In some embodiments, the systems and methods may be configured to operate as both sonar and radar devices, without departing from the scope of the present disclosure. In certain embodiments, when the systems and methods are configured for sonar imaging, the frequencies may be in both high and low frequency ranges in the range from 10 kHz to about 200 kHz. In certain embodiments, when the systems and methods are configured for radar imaging, the frequencies may be in the range from 100 MHz to about 30 GHz. Generally, the systems and methods described herein may be applied for any frequency range, without departing from the scope of the present disclosure.

Overpinging with Multiple SAS Transmitters

In water, the maximum range of a sonar is typically defined as the distance sound can travel to a target and back before the next transmission. However, after the next transmission, the prior ping continues to propagate through the water. If it is possible to use a prior ping, then the range of a sonar and/or area coverage rate of a sonar may be increased. If N total pings (N-1 prior pings) are fully used, then the area coverage rate may be increased by a factor of N.

Unfortunately, distant echoes are weaker than closer ones (assuming constant target strength). By using orthogonal signals, it may be possible to improve the signal to noise ratio (SNR), but it will still be nearly impossible to receive while a transmitter is transmitting. For a system with a classical range of R, this means it may be (almost) always impossible to observe echoes at ranges just past R.

Accordingly, in yet another aspect, the present disclosure relates to a solution to this SNR problem by adding multiple transmitters that are spaced and fired in a novel order so as provide multiple opportunities to recover data from the same range and phase center position and ensure that at least one of those observations is not jammed. In some embodiments, N separated transmitters may be used to increase the range of a virtual array by N.

In certain aspects, the systems and methods described herein include methods for generating a synthetic aperture sonar (SAS) signal. The methods may include moving a sonar array at a first velocity, the sonar array having at least three transmitters and a plurality of receivers, the array having a first length, wherein the first transmitter is positioned at a first fraction of the length along the first length, the second transmitter is positioned at a second fraction of the length along the first length, and the third transmitter is positioned at a third fraction of the length along the first length, and wherein the direction of motion is along a direction from the third transmitter towards the first transmitter. The methods may further include generating a first ping using the first and second transmitter, generating a second ping using the first and the third transmitter, and generating a third ping using the second and the third transmitter. In certain embodiments, the time taken for the sonar array to move between the first and second ping, and between the second and third ping, and between the third and first ping is equal to half the first length divided by the first velocity. In certain embodiments, the plurality of transmitters includes four or more transmitters.

In certain embodiments, generating the first ping includes generating using the first transmitter, a first acoustic signal at a first position, the first position being a whole number multiple of the first length added to the first fraction, and generating using the second transmitter, a second acoustic signal at a second position, wherein the second position being a whole number multiple of the first length added to the second fraction. In certain embodiments, generating the second ping includes generating using the first transmitter, a third acoustic signal at a third position, the third position being a whole number multiple of the first length added to the first fraction, and generating using the third transmitter, a fourth acoustic signal at a fourth position, wherein the fourth position being a whole number multiple of the first length added to the third fraction. In certain embodiments, generating the third ping includes generating using the second transmitter, a fifth acoustic signal at a fifth position, wherein the fifth position being a whole number multiple of the first length added to the second fraction, and generating using the third transmitter, a sixth acoustic signal at a sixth position, wherein the sixth position being a whole number multiple of the first length added to the third fraction.

At least one of the first, second and third ping may have a frequency in a range from about 1 kHz to about 100 kHz. In certain embodiments, at least one of the first, second and third ping has a frequency in a range greater than about 100 kHz. Generally, the sonar array may be disposed on at least one of an underwater vehicle or a surface vehicle for imaging an underwater terrain. The sonar array may also be disposed on at least one of an aerial vehicle or a terrestrial vehicle for imaging a terrestrial terrain.

In one example, consider an array with length L and maximum classical SAS range R at a velocity V (V*dt=L/2, R=c/2*dt=cL/4V) with a delay between pings of dt=L/2V. Assume that transmitters are (with zero being on the bow and distance increasing moving aft) at x=0, x=0.25L, x=0.6L. For the second transmitter to form the same virtual array as the first it must delay firing until the vehicle has moved sufficiently to position it (corresponding to about 0.25dt). Likewise, if the third transmitter is used, it must be delayed 0.6dt. Suppose ping 1 is formed using transmitters 1 and 2, ping 2 is formed using transmitters 1 and 3, ping three is formed using transmitters 2 and 3, and then the sequence is repeated. The firing sequence timing may then be:

Transmitter 1: [0, 1, off, 3, 4, off, . . . ]*dt
Transmitter 2: [0.25, off, 2.25, 3.25, off, 5.25, . . . ]*dt
Transmitter 3: [off, 1.6, 2.6, off, 4.6, 5.6, . . . ]*dt The combination of all ping times is therefore: [0, 0.25, 1, 1.6, 2.25, 2.6, 3, 3.25, 4, 4.6, 5.25, 5.6, etc]*dt. Transmitter 1 and 2 each form virtual arrays for ping position 1. Since jamming is caused by future pings, virtual array 1 ping 1 is jammed at the following ranges: [0.25, 1, 1.6, 2.25, 2.6, 3, 3.25, 4, 4.6, 5.25, 5.6, etc]*R. Virtual array 2 ping 1 is jammed at the following ranges: ([1, 1.6, 2.25, 2.6, 3, 3.25, 4, 4.6, 5.25, 5.6, etc]−0.25)*dt=[0.75, 1.35, 2, 2.35, 2.75, 3, 3.75, 4.35, 5, 5.35, etc]*R.

Since virtual array 1 is jammed at 0.25 R, but virtual array 2 is not, virtual array 2's signal is used for those immediate ranges. Since virtual array 2 is jammed at 0.75 R but virtual array 1 is not, virtual array 1's signal is used there. Since both arrays are jammed at 2R it is not possible to get an unjammed observation of 2R, therefore that is the greatest unjammed range. The ranges for which both arrays are jammed (the ranges at which the fused signal is jammed) are: [3, 6, 9, 12 etc]*R. Likewise, the second ping uses virtual arrays formed by transmitters 1 and 3, the third ping uses arrays 2 and 3, etc. Signals are interlaced in a similar matter for latter pings as well. Changing the signals from ping to ping further reduces noise suppression.

Although the transducers/projectors spacing was described above as being 0, 0.25*L and 0.6*L, the system 100 may include any number of projectors positioned at any suitable spacing and having any suitable firing sequences without departing from the scope of the present disclosure. Generally, system 100 may combine overpinging with multiple alongtrack projectors by either repeating the patter or by generating a new sequence, which may be random. As another example, system 100 may include an array of five projectors positioned at 0, 0.25*L, 0.4142*L, 0.6*L and 0.7321*L. Position 0.4142*L corresponds to [sqrt(2)−1]*L and position 0.732*L corresponds to [sqrt(3)−1]*L. In such an example, the firing sequences may be:

Transmitter 1: [0, 1, 2, 3, off, 5 etc.]*dt
Transmitter 2: [0.25, 1.25, 2.25, off, 4.25, 5.25, etc.]*dt
Transmitter 3: [0.4142, 1.4142, off, 3.4142, 4.4142, 5.4142, etc.]*dt
Transmitter 4: [0.6, off, 2.6, 3.6, 4.6, 5.6, etc.]*dt
Transmitter 5: [off, 1.7321, 2.7321, 3.7321, 4.7321, off, etc.]*dt They systems and methods described herein may be adapted as desired for both sonar and radar systems, and accordingly for both synthetic aperture sonar (SAS) and synthetic aperture radar (SAR) systems. For example, sonar transducers may be replaced with suitable radar transducers, and one or more components may be modified, added to or removed from the systems described herein to operate in a sonar and radar regime. In some embodiments, the systems and methods may be configured to operate as both sonar and radar devices, without departing from the scope of the present disclosure. In certain embodiments, when the systems and methods are configured for sonar imaging, the frequencies may be in both high and low frequency ranges in the range from 10 kHz to about 200 kHz. In certain embodiments, when the systems and methods are configured for radar imaging, the frequencies may be in the range from 100 MHz to about 30 GHz. Generally, the systems and methods described herein may be applied for any frequency range, without departing from the scope of the present disclosure.

Holographic Simultaneous Localization and Mapping (SLAM)

Classical holographic navigation for AUVs, by requiring at least one image to be from a synthetic aperture, does not enable a true SLAM (simultaneous localization and mapping) solution. This is because when a real aperture image is correlated with a synthetic aperture image, the position estimate update is an average one; the estimate can not be isolated to individual states.

In one aspect, the present disclosure relates to a method of removing the above described requirement of needing at least one synthetic aperture image or quasi-hologram for holographic navigation. In some embodiments, region connecting observation positions are defined and used in such a way as to enable real aperture correlation, e.g., by forming "correlation tubes." An idealized sonar is introduced and improves the correlation performance inside the tubes. In some embodiments, a new method of operation allows a typical survey sonar to use correlation tubes to improve its navigation.

In certain aspects, the systems and methods described herein include methods for determining a navigational position of a vehicle traversing a terrain. The methods may include receiving a first real aperture image of a portion of the terrain being traversed by the vehicle. The real aperture image may include acoustic data within a first frequency range obtained from prior imaging of the portion of the terrain. The methods include receiving a first position estimate representing a position from which the first real aperture image was obtained, receiving a second position estimate representing a preliminary estimate of a current position of the vehicle, and determining a correlation axis connecting the first position estimate and the second position estimate. The methods may further include coherently correlating the second real aperture image with the first real aperture image, and updating the second position estimate based on the coherent correlation. The step of generating the second real aperture image may include receiving a reflected acoustic signal and steering the reflected acoustic signal along the correlation axis.

In certain embodiments, the first position estimate is calculated using at least one of global positioning system (GPS) estimation, inertial guidance systems, compass and accelerometer. The first real aperture image may be generated by a first vehicle in a first position and the second real aperture image may be generated by the first vehicle in a second position. Alternatively, the first real aperture image may be generated by a first vehicle in a first position and the second real aperture image may be generated by a second vehicle in a second position.

In certain embodiments, the first and second frequency ranges include a minimum frequency greater than 100 kHz. Generally, the first and second frequency ranges may be from about 100 Hz to about 100 kHz.

In certain embodiments, the terrain includes an underwater terrain. The vehicle may include at least one of an underwater vehicle or a surface vehicle for traversing the underwater terrain. The vehicle includes at least one of an aerial vehicle or a terrestrial vehicle for traversing a terrestrial or extra terrestrial terrain. Alternatively, the vehicle may include a robotic vehicle for traversing an indoor terrain.

In another aspect, the systems and methods described herein include systems for determining a navigational position of a vehicle traversing a terrain. The systems may include a map store, for receiving a first real aperture image of a portion of the terrain being traversed by the vehicle, the real aperture image including acoustic data within a first frequency range obtained from prior imaging of the portion of the terrain. The systems may include a transducer array, for generating a second real aperture image of the portion of the terrain by insonifying the portion of the terrain with an acoustic signal within a second frequency range directed along the correlation axis. The second frequency range may at least partially overlap with the first frequency range. The systems may further include a signal correlator for coherently correlating the second real aperture image with the first real aperture image and a central control unit for receiving a first position estimate representing a position from which the first real aperture image was obtained, and receiving a second position estimate representing a preliminary estimate of a current position of the vehicle. The central control unit may be configured for determining a correlation axis connecting the first position estimate and the second position estimate, and updating the second position estimate based on the coherent correlation.

In another aspect, the systems and methods described herein include methods for determining a navigational position of a vehicle traversing a terrain. The methods may include receiving a sonar image of a portion of the terrain being traversed by the vehicle, the sonar image including acoustic data within a first frequency range obtained from prior imaging of the portion of the terrain. The methods may further include receiving a first position estimate representing a position from which the first sonar image was obtained, receiving a second position estimate representing a preliminary estimate of a current position of the vehicle, and determining a correlation axis connecting the first position estimate and the second position estimate. The methods may include generating a synthetic aperture image of the portion of the terrain by insonifying the portion of the terrain with an acoustic signal within a second frequency range directed along the correlation axis, wherein the second frequency range at least partially overlaps with the first frequency range. The methods may include coherently correlating the synthetic aperture image with the sonar image, and updating the second position estimate based on the coherent correlation. In certain embodiments, methods include receiving second sound speed estimate corresponding to the second position and updating the second sound speed estimate based on the coherent correlation.

As noted earlier, generally, holographic navigation works because a hologram which is defined over a range of angles contains all possible images within that set of angles (subject to a few constraints such as frequency limitations, occlusion, etc). When a real aperture image is correlated against a synthetic aperture image, the correlation process transparently identifies the position in the quasi-hologram where the real aperture image originated. The correlation works because although the real aperture sonar sees each object from one vantage point, and sees a set of objects from a set of different vantage points, the quasi-hologram is a multi-aspect record. When two real aperture images are compared, only targets along a line connecting the two sonars can be correlated, previously assumed to be impossible. Since the percentage of features that are collinear with the two sonars is exceptionally small, and since the correlation result from the area off of that line is noise, the resulting signal to noise ratio for the correlation is near zero.

In some embodiments, the above described method solves this problem by combining a preliminary navigation estimate, a real aperture array, and "correlation tubes." In some embodiments, if the AUV has a reasonably accurate estimate of its position when it made a prior observation, it can define a reasonably accurate vector connecting the two positions. Using a real aperture array, the sonar can steer the signals received at either position along the direction of that vector. By forming both beams down the correct correlation direction, the signal to noise ratio improves considerably.

In some embodiments, the real aperture sonars are long enough that both are in the nearfield and it is possible to form a beam without spurious information (there is a temptation to call it "noise free", but it would, of course, still be subject to environmental noise sources). For example, consider two parallel arrays of length L separated by a distance D along the broadside vector of the arrays. If the resolution of the arrays at the separation distance is less than the length of the arrays then the arrays have sufficient resolution to "block out" energy from areas with non-overlapping aspects. (Mathematically, this is very similar to a nearfield constraint). Assuming a wavelength $\lambda$ and making a small angle assumption, the angular resolution of the arrays is $\Delta\Theta=\lambda/L$, and the across range resolution is $\Delta x=r\Delta\Theta=r\ \lambda/L$. Since we want $\Delta x<L$ or $r\ \lambda/L<L$, the technique performs best when $r<L^2/\lambda$. The nonlinear relationship between r and L means that the maximum range increases quickly as the array length grows. For most existing synthetic aperture sonars, with L=0.50 m and $\lambda$=0.01 m, the maximum range is approximately 25 m. In some embodiments, with L=2.5 m and $\lambda$=0.0083 m the maximum range is approximately 753 m, or three times the intended survey range of 250 m. More generally, given a beam width $\phi$ the range constraint becomes $r<\cos^2\phi L^2/\lambda$. According to an illustrative embodiment, a system designed according to the beam width constraint can use correlation tubes off of broadside without performance degradation.

Figure 12:
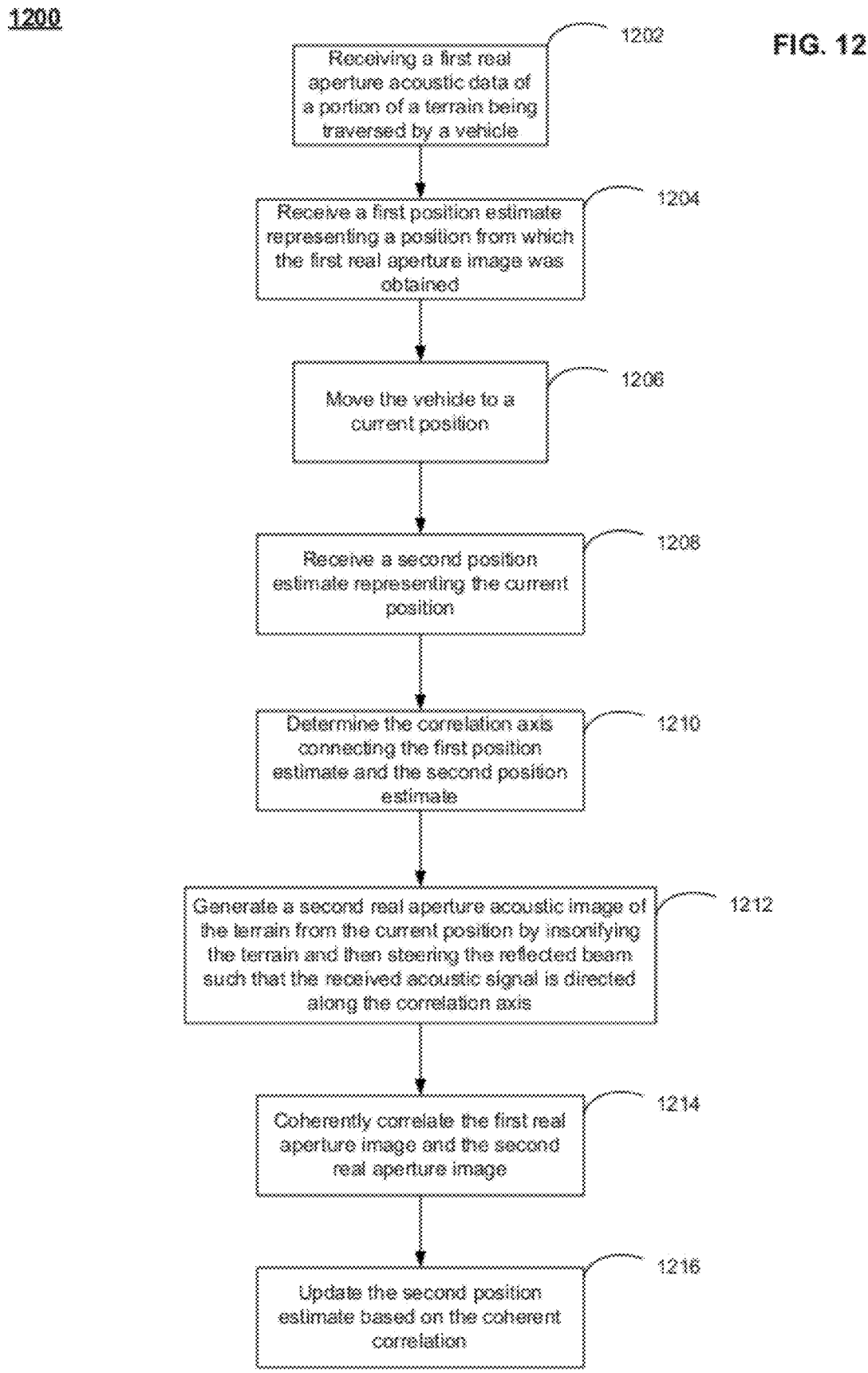
FIG. 12 depicts a process for simultaneous localization and mapping (SLAM) using real aperture sonar images, according to an illustrative embodiment of the present disclosure.

FIG. 12 depicts a process for simultaneous localization and mapping (SLAM) using real aperture sonar images, according to an illustrative embodiment of the present disclosure. The sonar system 100 on a vehicle may receive a first real aperture acoustic data of a portion of the terrain being traversed by the vehicle (step 1202). The sonar system 100 (e.g., CCU 160) may receive a first position estimate representing a position from which the first real aperture image was obtained (step 1204). In some instances, the position estimate and the first data (or image) may have been obtained a priori (either on the same mission or on a prior mission) by the same vehicle as it traverses the terrain. In other instances, the position estimate and the first data (or image) may have been obtained by another vehicle (at the same time or different time) traversing the terrain. Both vehicles may be traversing the terrain simultaneously and communicating with each other. The vehicle receiving the images may be moved to a current position (step 1206). At the current position, the vehicle may receive a second position estimate representing the current position (step 1208). The sonar system 100 may then determine the correlation axis (or correlation tube) connecting the first position estimate and the second position estimate (step 1210). The correlation may determine the direction of beamforming for the vehicle in the current position. The sonar system 100 may insonify the terrain and generate a second real aperture image of the terrain from the current position (step 1212). The beamformer 134 of the sonar system 100 may steer the receiving signal such that the received acoustic signal is directed towards the terrain and along the correlation axis or tube (step 1212), thereby allowing the vehicle at the current position to view the terrain along the same axis as the direction along which the first real aperture image was obtained.

Most synthetic aperture sonars are used to perform surveys. Most surveys follow a lawnmower pattern. Although it is typical when surveying using a lawnmower pattern to overlap adjacent passes (to ensure full coverage), that overlap is not suitable for holographic navigation (since it has the wrong spectral orientation). Assuming the sonar has a maximum useful range R, swaths are typically spaced 2R apart, and the portion of the imagery from an adjacent survey leg that is oriented correctly for holographic navigation exists at the ranges between 2R and 3R. The sonar design of the systems herein is advantageous as it enables clean correlation at triple the baseline operating range.

In some embodiments, there may be a plurality of ways to navigate relative to distant sonar imagery (without looping around to look at it). One such way may include a SAS, such as sonar system 100 and slowing the vehicle down to ⅓ speed, which will then triple the range, enabling a holographic navigation fix. Generally, the vehicle may be slowed down any amount suitable to increase the range by a desirable amount. Another way is to include a dual frequency system, one frequency can map continuously while another alternates between a normal ping rate (to map) and a ⅓ ping rate (to observe distant regions). A third way may be to use sequences of orthogonal signals. If the distant echoes are sufficiently orthogonal to the closer echoes they can be used for correlation and a navigation update. Unlike imaging at long range, it is not necessarily to use signals taken at all ranges (including portions where the SNR is poor due to other transmissions). It is generally sufficient to use only range regions with "good enough" SNR. When correlating relative to a prior pass it is possible to steer beams through many different prior robot positions, producing many different measurements. Used in post-processing this can result in an accurate map, although, in some embodiments, a limited set of beams may be processed in real time.

They systems and methods described herein may be adapted as desired for both sonar and radar systems, and accordingly for both synthetic aperture sonar (SAS) and synthetic aperture radar (SAR) systems. For example, sonar transducers may be replaced with suitable radar transducers, and one or more components may be modified, added to or removed from the systems described herein to operate in a sonar and radar regime. In some embodiments, the systems and methods may be configured to operate as both sonar and radar devices, without departing from the scope of the present disclosure. In certain embodiments, when the systems and methods are configured for sonar imaging, the frequencies may be in both high and low frequency ranges in the range from 10 kHz to about 200 kHz. In certain embodiments, when the systems and methods are configured for radar imaging, the frequencies may be in the range from 100 MHz to about 30 GHz. Generally, the systems and methods described herein may be applied for any frequency range, without departing from the scope of the present disclosure.

Bistatic and Monostatic Gapfiling for SAS

Synthetic aperture sonars perform poorly in the near "nadir" regime (directly under the vehicle). This is because the partial derivative of range with respect to horizontal distance may be approximately zero directly beneath the sonar.

There are two traditional solutions to the aforementioned problem. The first is to use a real aperture sonar to image directly under the vehicle. However, as the survey sonar range increases it is generally necessary to survey from a higher altitude, causing the resolution of a real aperture gapfiller generally to drop for a given aperture. This is due to two effects: decreased spatial resolution due to increased range, and needing to use lower frequencies/longer wavelengths due to range and absorption. Even though the aperture can be increased, at realistic altitudes for a long range survey sonar, it is impossible to get resolutions that approach SAS resolutions.

Applicants solve this problem by using a plurality of sonar vehicles that are positioned so as to be able to hear each other's transmissions and image bistatically. The bistatic image has SAS level resolution under either vehicle, and poor resolution in the gaps between the vehicles. By fusing SAS imagery and bistatic SAS imagery it is possible to have a very high resolution map.

In certain embodiments, a long range vehicle may be used in conjunction with a smaller vehicle. In such embodiments, the long range vehicle used for imaging, may include a very large gap beneath it. A second, smaller vehicle may then be used specifically to image the large vehicle's gap. The second vehicle may fly the same track line, but below the large vehicle.

In certain other embodiments, a vehicle may be used at higher altitude and create gap beneath the vehicle that is comparable to the range of the sonar. In such embodiments, one or more adjacent mission legs are then flown such that subsequent legs fill the gap of prior legs with minimal waste. This design assumes a steeper grazing angle than traditional SAS, but would be considered more typical of synthetic aperture radar (SAR). From a grazing angle compensation/holographic navigation perspective, described above, the reduced range of grazing angles may be beneficial.

Passive Relative Localization

When multiple vehicles perform a survey it is necessary to overlap their survey areas so as to account for inertial navigation errors that accrue over the mission. (This assumes an unknown area without a predeployed beacon network such as long baseline or ultrashort baseline.) Since the inertial navigation error grows with time, there can be substantial drift over a long mission. This large drift requires a large overlap, substantially decreasing the net area coverage rate of the sonar. If, instead, vehicles can fly in tight formation then that overlap can be reduced, and gross errors only occur at the edge of the areas imaged by the formation.

One way for the vehicles to maintain their formation is by using beacon systems. Using an onboard ultrashort baseline navigation system, it is possible to measure the range and bearing to another vehicle. However, this requires an additional system.

Instead, Inventor proposes a reduction in which the vehicle (which is assumed to have a synthetic aperture sonar array and system 100) passively listens for the transmissions from other vehicles using its real aperture sonar. Using the received signal it may measure the bearing to the other vehicle (but not the range). Measuring range passively is difficult since most SAS's are "slaved to speed" meaning that the pings are timed based on the perceived position of the vehicle. Schemes may be used to passively estimate range based on time of arrival, but the random component of SAS ping timing makes this undesirable.

The methods and systems described herein measure range by passively dithering the vehicles relative to one another and fusing the data in a navigation filter. For instance, consider two vehicles flying in parallel with slowly drifting inertial navigation systems. Assume that they each have a base survey velocity of 2 m/s. Assume that for 5 minutes vehicle #1 flies at 2.05 m/s and vehicle #2 flies at 1.95 m/s, resulting in a 30 m change in position. If the vehicles are 300 m apart, this corresponds to a 5.6 degree change in position; if they are 310 m apart, this may correspond to an 5.8 degree change. A 2.5 m array with a wavelength of 0.008 m has an angular resolution of 0.18 degrees, making a 10 m range variation observable.

In an alternative instantiation of methods and systems described herein, the vehicle passively listens to a timed pinger on other vehicles to estimate range. A filter onboard the vehicle estimates clock drift. Although dithering is not necessary if listening to a passive pinger dithering does make clock drift more observable.

Pressure and Substance Compensation

In another aspect, the systems and methods described herein relate to a device that protects an electrical or electronic component from external pressure or exposure to substances, e.g., an oil compensated battery. In some embodiments, the device includes a housing made of both electrical conductors and one or more electrical insulators surrounds one or more electrical components. This structure may be designed to support external hydrostatic pressure or other forces which would otherwise adversely affect the integrity or operation of the contained electrical component. In some embodiments, the device may be sealed against the intrusion of liquids or gases by conventional methods possibly including but not limited to o-rings, gaskets, glues, or mechanical interference press fits between parts (e.g., see details in FIGS. 13A and 13B below). There may also be electrical contact features, whether separate components such as springs or wires, or integral mechanical features of the housing components themselves, which make electrical contact between the terminals of the contained electrical component and the electrically conductive portions of the housing.

FIGS. 13A and 13B show an exemplary embodiment of such a device 1300. This embodiment of the device forms a housing to resist external hydrostatic pressure applied to a cylindrical electrical fuse or any other electrical component 1302. The housing is constructed of a central section 1304 made of a rigid insulating material, two end caps 1306a and 1306b (collectively, "1306") made of an electrically conductive metal, two o-ring seals 1310, and one or more electrically conductive springs 1308. The housing is assembled as shown in FIG. 13 so that the end caps 1306 and springs 1308 form conductive paths to each terminal of the contained fuse or other electrical component. Any other conductive material may be used in addition to or in the alternative with spring 1308, without departing from the scope of the present disclosure. For example, such conductive material may include wire meshes, conductive liquid, or conductive foam. The housing geometry is constructed so that the exterior dimensions of the housing are equivalent to the standard dimensions of a cylindrical fuse or other electrical component larger than the contained fuse or other electrical component. The device/housing may be configured to house one or more than one electrical component. In certain embodiments a plurality of electrical components may be placed in parallel or in series within the housing.

The systems and methods described herein may be realized as a software component operating on a conventional data processing system such as a Unix system. In that embodiment, these mechanisms can be implemented as a C language computer program, or a computer program written in any high level language including Matlab, C++, Fortran, Java or BASIC. Additionally, in an embodiment where microcontrollers or DSPs are employed, the mapping mechanism can be realized as a computer program written in microcode or written in a high level language and compiled down to microcode that can be executed on the platform employed. The development of such data processing systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, *Programming in C*, Hayden Publishing (1983). It is noted that DSPs are particularly suited for implementing signal processing functions, including preprocessing functions such as image enhancement through adjustments in contrast, edge definition and brightness. Developing code for the DSP and microcontroller systems follows from principles well known in the art. The system also provides and enables as is known to those of skill in the art, object oriented frameworks are generally understood as a set of classes that embody a design for solutions to a family of related problems. See The C++ *Programming Language*, 2nd Ed., Stroustrup Addison-Wesley. Accordingly, a framework for mapping and filtering may be created that provides a prefabricated structure, or template, of a working mapping and filtering program.

Variations, modifications, and other implementations of what is described may be employed without departing from the spirit and scope of the systems and methods described herein. For example, though the systems and methods are described in the context of underwater mapping and navigation using sonar signals, the systems and methods may be equally applicable for mapping and navigating in aerial or other land or space-based terrains and using other imaging technologies include radar, optical signals, and any acoustic or electromagnetic signal. Moreover, any of the method and system features described above or incorporated by reference may be combined with any other suitable method or system feature disclosed herein or incorporated by reference, and is within the scope of the contemplated systems and methods. The systems and methods may be embodied in other specific forms without departing from the spirit or essential characteristics thereof. The foregoing embodiments are therefore to be considered in all respects illustrative, rather than limiting of the systems and methods described herein.

The invention claimed is:

1. A method of generating a synthetic aperture sonar image, comprising:
   providing a synthetic aperture sonar (SAS) array having at least one transmitter element and a plurality of receiver elements arranged along a first axis, wherein each of the transmitter element and the receiver elements have a first width, wherein the transmitter element is configured to generate a first set of signals having a plurality of orthogonal acoustic signals, and
   calculating the effective spacing of the SAS array, representing an effective distance between the transmitter element and the receiver elements during motion;

simultaneously moving the SAS array along the first axis and generating, using the transmitter element, a first acoustic signal from the first set of signals;

calculating a threshold distance as the effective spacing divided by the number of acoustic signals in the first set of signals;

in response to determining that the SAS array has moved the threshold distance, generating, using the transmitter element, a second acoustic signal from the first set of signals, wherein the second acoustic signal is orthogonal to the first acoustic signal.

2. The method of claim 1, wherein the effective spacing is about half the first width.

3. The method of claim 1, wherein one or more acoustic signals in the first set of signals has a frequency greater than 100 kHz.

4. The method of claim 1, wherein one or more acoustic signals in the first set of signals has a frequency in range from about 100 Hz to about 100 kHz.

5. The method of claim 1, wherein the SAS array is moved at fixed speed and the determination whether the SAS array has moved the threshold distance is based on a time delay.

6. The method of claim 1, wherein during a first time period the SAS array transmits only the first acoustic signal, during a second time period the SAS array transmits both the first acoustic signal and the second acoustic signal, and during a third time period the SAS array transmits only the second acoustic signal.

7. The method of claim 1, wherein a duration of the first acoustic signal is substantially similar to a duration of the second acoustic signal.

8. The method of claim 1, wherein one or more signals in the first set of signals includes a short pulse sound generated for undersea measurement.

9. The method of claim 1, wherein the SAS array is disposed on at least one of an underwater vehicle or a surface vehicle for imaging an underwater terrain.

10. The method of claim 1, wherein the SAS array is disposed on at least one of an aerial vehicle or a terrestrial vehicle for imaging a terrestrial terrain.

11. A method of generating a synthetic aperture sonar (SAS) image, comprising:

providing a synthetic aperture sonar (SAS) array having at least one transmitter element and a plurality of receiver elements arranged along a first axis, wherein each of the transmitter element and the receiver elements have a first width; and simultaneously moving the sonar array along the first axis and generating, using the transmitter element, a first set of acoustic signals at intervals having a first duration and a second set of acoustic signals at intervals having a second duration;

wherein the sonar array includes a first effective spacing representing an effective distance between the transmitter element and the receiver elements during motion;

wherein the first set of acoustic signals are orthogonal to the second set of acoustic signals; and wherein the first duration and the second duration are selected such that the first effective spacing is less than one-half the first width.

12. The method of claim 11, wherein the first duration and the second duration are selected such that the first effective spacing is about one-quarter the first width.

13. The method of claim 11, further comprising generating a first number of acoustic signals, wherein the first duration and the second duration are selected such that the first effective spacing is about one half the first width divided by the first number of acoustic signals.

14. A system for generating a synthetic aperture sonar (SAS) image, comprising:

a synthetic aperture sonar (SAS) array having at least one transmitter element and a plurality of receiver elements arranged along a first axis, wherein each of the transmitter element and the receiver elements have a first width, wherein the transmitter element is configured to generate a first set of signals having a plurality of orthogonal acoustic signals; and a processor, configured for calculating the effective spacing of the SAS array, representing an effective distance between the transmitter element and the receiver elements during motion;

simultaneously moving the SAS array along the first axis and generating, using the transmitter element, a first acoustic signal from the first set of signals;

calculating a threshold distance as the effective spacing divided by the number of acoustic signals in the first set of signals;

in response to determining that the SAS array has moved the threshold distance, generating, using the transmitter element, a second acoustic signal from the first set of signals, wherein the second acoustic signal is orthogonal to the first acoustic signal.

* * * * *